United States Patent
Song et al.

(10) Patent No.: US 9,549,334 B2
(45) Date of Patent: Jan. 17, 2017

(54) METHOD AND SYSTEM FOR TRANSMITTING INFORMATION THROUGH BACKHAUL LINK, PROXY DEVICE, AND ACCESS DEVICE

(71) Applicant: HUAWEI TECHNOLOGIES CO., LTD., Shenzhen (CN)

(72) Inventors: Weiwei Song, Shenzhen (CN); Yinghui Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/636,763

(22) Filed: Mar. 3, 2015

(65) Prior Publication Data
US 2015/0181455 A1    Jun. 25, 2015

Related U.S. Application Data

(63) Continuation of application No. PCT/CN2012/080937, filed on Sep. 3, 2012.

(51) Int. Cl.
*H04W 28/02* (2009.01)
*H04W 88/04* (2009.01)
(Continued)

(52) U.S. Cl.
CPC ....... *H04W 28/0205* (2013.01); *H04W 40/005* (2013.01); *H04W 72/044* (2013.01);
(Continued)

(58) Field of Classification Search
CPC ........... H04W 28/0205; H04W 40/005; H04W 72/004; H04W 72/0446; H04W 88/04; H04W 88/08; H04W 84/045; H04W 92/045; H04W 92/20; H04L 41/08
(Continued)

(56) References Cited

U.S. PATENT DOCUMENTS

| 2009/0080333 A1* | 3/2009 | Ozer | H04W 84/22 370/237 |
| 2009/0310527 A1* | 12/2009 | Rao | H04W 92/20 370/315 |

(Continued)

FOREIGN PATENT DOCUMENTS

| CN | 102083096 | 6/2011 |
| CN | 102149205 | 8/2011 |

(Continued)

OTHER PUBLICATIONS

International Search Report mailed May 9, 2013 for corresponding International Patent Application No. PCT/CN2012/080937.

(Continued)

*Primary Examiner* — Nathan Taylor
(74) *Attorney, Agent, or Firm* — Staas & Halsey LLP

(57) ABSTRACT

Embodiments of the present invention provide a method and system for transmitting information through a backhaul link, a proxy device, and an access device. The method includes: determining, by a proxy device, that to-be-transmitted information needs to be transmitted through a backhaul link, where the backhaul link is a backhaul link that implements transmission between the proxy device and an access device through an air interface and is in a deactivated state; and activating the backhaul link, and transmitting the to-be-transmitted information through the activated backhaul link. Therefore, a problem that backhaul links based on a large number of S1 or X2 interfaces consume a large number of memory resources, causing a transmission bottleneck in the backhaul links, is solved.

9 Claims, 7 Drawing Sheets

(51) Int. Cl.
  *H04W 74/00* (2009.01)
  *H04W 88/08* (2009.01)
  *H04W 72/04* (2009.01)
  *H04W 40/00* (2009.01)
  H04W 92/20 (2009.01)
  H04W 84/04 (2009.01)
  H04W 92/04 (2009.01)

(52) U.S. Cl.
  CPC ....... *H04W 72/0446* (2013.01); *H04W 88/04* (2013.01); *H04W 88/08* (2013.01); *H04W 84/045* (2013.01); *H04W 92/045* (2013.01); *H04W 92/20* (2013.01)

(58) Field of Classification Search
  USPC ............................... 455/452.1; 370/228, 329
  See application file for complete search history.

(56) References Cited

U.S. PATENT DOCUMENTS

| | | | | |
|---|---|---|---|---|
| 2011/0208842 | A1* | 8/2011 | Mildh | H04B 7/155 709/220 |
| 2011/0242970 | A1* | 10/2011 | Prakash | H04W 76/068 370/225 |
| 2012/0281614 | A1* | 11/2012 | Deng | H04W 88/04 370/315 |
| 2012/0327842 | A1* | 12/2012 | Shen | H04L 5/0053 370/315 |
| 2013/0003534 | A1* | 1/2013 | Henry | H04W 40/00 370/228 |
| 2013/0142136 | A1* | 6/2013 | Pi | H04W 28/0289 370/329 |
| 2013/0163485 | A1 | 6/2013 | Wan et al. | |

FOREIGN PATENT DOCUMENTS

| | | |
|---|---|---|
| CN | 102215058 | 10/2011 |
| CN | 102378183 A | 3/2012 |
| CN | 102378374 A | 3/2012 |
| EP | 2 521 413 A1 | 11/2012 |
| EP | 2 611 245 A1 | 7/2013 |
| GB | 2475906 | 6/2011 |
| WO | 2010/047626 A1 | 4/2010 |
| WO | 2011/102772 A1 | 8/2011 |
| WO | 2011/158297 A1 | 12/2011 |

OTHER PUBLICATIONS

Extended European Search Report dated Aug. 11, 2015 in corresponding European Patent Application No. 12883710.1.
International Search Report mailed on May 9, 2013 in corresponding International Patent Application No. PCT/CN2012/080937.
Chinese Office Action dated Oct. 8, 2016 in corresponding Chinese Patent Application No. 201280024395.8 (11 pages).

* cited by examiner

METHOD AND SYSTEM FOR TRANSMITTING INFORMATION THROUGH BACKHAUL LINK, PROXY DEVICE, AND ACCESS DEVICE

CROSS-REFERENCE TO RELATED APPLICATIONS

This application is a continuation of International Application No. PCT/CN2012/080937, filed on Sep. 3, 2012, which is hereby incorporated by reference in its entirety.

TECHNICAL FIELD

The present invention relates to communications technologies, and in particular, to a method and system for transmitting information through a backhaul link, a proxy device, and an access device.

BACKGROUND

With development of mobile communications technologies and large-scale deployment of 3G or 4G networks, small-cell access points having small coverage areas, such as a small cell (small cell) or a small base station are densely deployed in places where there are many mobile users (for example, a shopping mall), so that the users may enjoy high-rate data services.

However, dense deployment of small base stations causes a mobility management entity (Mobility Management Entity, MME) or a serving gateway (Serving-Gateway, S-GW) to establish a large number of S1 interfaces with the small base stations, or causes a macro base station macro eNB to establish a large number of X2 interfaces with the small base stations. Because existing backhaul links based on Stream Control Transmission Protocol (Stream Control Transmission Protocol, SCTP) bearers also consume a large number of memory resources, the backhaul links based on a large number of activated S1 or X2 interfaces, even if no data service is transmitted, increase bearing pressure of the MME or S-GW or macro eNB, easily causing a transmission bottleneck in the backhaul links.

SUMMARY

A method and system for transmitting information through a backhaul link, a proxy device, and an access device in embodiments of the present invention are used to solve the problem that in the existing method for transmitting information through backhaul links, a large number of memory resources are consumed, causing a transmission bottleneck in the backhaul links.

According to a first aspect, an embodiment of the present invention provides a method for transmitting information through a backhaul link, where the method includes:

determining, by a proxy device, that to-be-transmitted information needs to be transmitted through a backhaul link, where the backhaul link is a backhaul link that implements transmission between the proxy device and an access device through an air interface and is in a deactivated state; and activating the backhaul link, and transmitting the to-be-transmitted information through the activated backhaul link.

In a first possible implementation manner, the activating the backhaul link includes:

sending, by the proxy device, an activation command for activating the backhaul link to the access device, so that the access device activates, according to the activation command, the backhaul link that is connected to the proxy device through the air interface.

On a basis of the first possible implementation manner, in a second possible implementation manner, after the transmitting the to-be-transmitted information through the activated backhaul link, the method includes:

sending, by the proxy device, a deactivation command to the access device, so that the access device deactivates, according to the deactivation command, the backhaul link that is connected to the proxy device through the air interface.

In a third possible implementation manner, before the determining, by a proxy device, that to-be-transmitted information needs to be transmitted through a backhaul link, the method includes:

sending, by the proxy device, activation time information to the access device, where the activation time information includes an activation start time and a deactivation start time, so that the access device activates, according to the activation start time, the backhaul link that is connected to the proxy device through the air interface, and deactivates, according to the deactivation start time, the backhaul link that is connected to the proxy device through the air interface.

In a fourth possible implementation manner, the activating the backhaul link includes:

sending, by the proxy device, an activation command and an identifier of the access device to an intermediate device by using higher layer signaling, so that the intermediate device sends the activation command to the access device according to the identifier of the access device, so that the access device activates, according to the activation command, the backhaul link that is connected to the proxy device through the air interface.

On a basis of the fourth possible implementation manner, in a fifth possible implementation manner, the transmitting the to-be-transmitted information through the activated backhaul link includes:

sending, by the proxy device, the to-be-transmitted information to the intermediate device through the activated backhaul link, so that the intermediate device sends the to-be-transmitted information to the access device through the activated backhaul link; or receiving, through the activated backhaul link, the to-be-transmitted information that comes from the access device and is forwarded by the intermediate device.

On a basis of the fifth possible implementation manner, in a sixth possible implementation manner, after the transmitting the to-be-transmitted information through the activated backhaul link, the method includes:

sending, by the proxy device, a deactivation command and the identifier of the access device to the intermediate device by using higher layer signaling, so that the intermediate device sends the deactivation command to the access device according to the identifier of the access device, so that the access device deactivates, according to the deactivation command, the backhaul link that is connected to the proxy device through the air interface.

According to a second aspect, an embodiment of the present invention provides a method for transmitting information through a backhaul link, where the method includes:

determining, by a proxy device, that to-be-transmitted information needs to be transmitted through a backhaul link between the proxy device and an access device; and establishing a signaling radio bearer SRB based backhaul link with the access device, and transmitting the to-be-transmitted information through the signaling radio bearer SRB based backhaul link.

In a first possible implementation manner, the establishing a signaling radio bearer SRB based backhaul link with the access device includes:

receiving, by the proxy device, signaling radio bearer SRB configuration information from the access device by using higher layer signaling, or sending the SRB configuration information to the access device, and establishing the signaling radio bearer SRB based backhaul link with the access device.

According to a third aspect, an embodiment of the present invention provides a method for transmitting information through a backhaul link, where the method includes:

determining, by an access device, that to-be-transmitted information needs to be transmitted through a backhaul link, where the backhaul link is a backhaul link that implements transmission between a proxy device and the access device through an air interface and is in a deactivated state; and activating the backhaul link, and transmitting the to-be-transmitted information through the activated backhaul link.

In a first possible implementation manner, the activating the backhaul link includes:

sending, by the access device, an activation request to the proxy device, so that the proxy device sends an activation command for activating the backhaul link to the access device; and activating, according to the activation command, the backhaul link that is connected to the proxy device through the air interface.

On a basis of the first possible implementation manner, in a second possible implementation manner, after the transmitting the to-be-transmitted information through the activated backhaul link, the method includes:

receiving, by the access device, a deactivation command sent by the proxy device, and deactivating, according to the deactivation command, the backhaul link that is connected to the proxy device; or if it is determined that the activated backhaul link does not need to transmit to-be-transmitted information within a preset time, deactivating, by the access device, the backhaul link that is connected to the proxy device through the air interface.

In a third possible implementation manner, before the determining that to-be-transmitted information needs to be transmitted through a backhaul link, the method includes:

receiving, by the access device, activation time information sent by the proxy device, where the activation time information includes an activation start time and a deactivation start time.

On a basis of the third possible implementation manner, in a fourth possible implementation manner, the activating the backhaul link includes:

if it is determined that a current system time is the activation start time, activating, by the access device, the backhaul link that is connected to the proxy device through the air interface.

In a fifth possible implementation manner, the activating the backhaul link includes:

receiving, by the access device by using higher layer signaling, an activation command forwarded by an intermediate device; and activating, according to the activation command, the backhaul link that is connected to the proxy device through the air interface, where the activation command is sent by the proxy device to the intermediate device by using higher layer signaling.

On a basis of the fifth possible implementation manner, in a sixth possible implementation manner, the transmitting the to-be-transmitted information through the activated backhaul link includes:

sending, by the access device, the to-be-transmitted information to the intermediate device through the activated backhaul link, so that the intermediate device sends the to-be-transmitted information to the proxy device through the activated backhaul link; or receiving, through the activated backhaul link, the to-be-transmitted information that comes from the proxy device and is forwarded by the intermediate device.

On a basis of the fifth and sixth possible implementation manners, in a seventh possible implementation manner, after the transmitting the to-be-transmitted information through the activated backhaul link, the method includes:

receiving, by the access device by using higher layer signaling, a deactivation command that is forwarded by the intermediate device, and deactivating, according to the deactivation command, the backhaul link that is connected to the proxy device through the air interface, where the deactivation command is sent by the proxy device to the intermediate device by using higher layer signaling.

According to a fourth aspect, an embodiment of the present invention provides a method for transmitting information through a backhaul link, where the method includes:

determining, by an access device, that to-be-transmitted information needs to be transmitted through a backhaul link between the access device and a proxy device; and establishing a signaling radio bearer SRB based backhaul link with the proxy device, and transmitting the to-be-transmitted information through the signaling radio bearer SRB based backhaul link.

In a first possible implementation manner, the establishing a signaling radio bearer SRB based backhaul link with the proxy device includes:

receiving, by the access device, signaling radio bearer SRB configuration information from the proxy device by using higher layer signaling, or sending the SRB configuration information to the proxy device, and establishing the signaling radio bearer SRB based backhaul link with the proxy device.

According to a fifth aspect, an embodiment of the present invention provides a proxy device, including:

a first determining module, configured to determine that to-be-transmitted information needs to be transmitted through a backhaul link, where the backhaul link is a backhaul link that implements transmission between the proxy device and an access device through an air interface and is in a deactivated state;

a first activating module, configured to activate the backhaul link on a basis that the first determining module determines that the to-be-transmitted information needs to be transmitted through the backhaul link; and a first transmitting module, configured to transmit the to-be-transmitted information through the activated backhaul link on a basis that the first activating module activates the backhaul link.

According to a sixth aspect, an embodiment of the present invention provides a proxy device, including:

a first determining module, configured to determine that to-be-transmitted information needs to be transmitted through a backhaul link between the proxy device and an access device;

a first establishing module, configured to establish a signaling radio bearer SRB based backhaul link with the access device on a basis that the first determining module determines that the to-be-transmitted information needs to be transmitted through the backhaul link between the proxy device and the access device; and a first transmitting module, configured to transmit the to-be-transmitted information through the signaling radio bearer SRB based backhaul link on a basis of the signaling radio bearer SRB based backhaul link that is established by the first establishing module.

According to a seventh aspect, an embodiment of the present invention provides an access device, including:

a first determining module, configured to determine that to-be-transmitted information needs to be transmitted through a backhaul link, where the backhaul link is a backhaul link that implements transmission between a proxy device and the access device through an air interface and is in a deactivated state;

a first activating module, configured to activate the backhaul link on a basis that the first determining module determines that the to-be-transmitted information needs to be transmitted through the backhaul link; and a first transmitting module, configured to transmit the to-be-transmitted information through the activated backhaul link on a basis of the backhaul link that is activated by the first activating module.

According to an eighth aspect, an embodiment of the present invention provides an access device, including:

a first determining module, configured to determine that to-be-transmitted information needs to be transmitted through a backhaul link between the access device and a proxy device;

a first establishing module, configured to establish a signaling radio bearer SRB based backhaul link with the proxy device on a basis that the first determining module determines that the to-be-transmitted information needs to be transmitted through the backhaul link between the access device and the proxy device; and a first transmitting module, configured to transmit the to-be-transmitted information through the signaling radio bearer SRB based backhaul link on a basis of the signaling radio bearer SRB based backhaul link that is established by the first establishing module.

According to a ninth aspect, an embodiment of the present invention provides a system for transmitting information through a backhaul link, where the system includes the foregoing proxy device and access device.

According to a tenth aspect, an embodiment of the present invention provides a proxy device, including a processor, configured to: determine that to-be-transmitted information needs to be transmitted through a backhaul link, where the backhaul link is a backhaul link that implements transmission between the proxy device and an access device through an air interface and is in a deactivated state; and activate the backhaul link, and transmit the to-be-transmitted information through the activated backhaul link.

In a first possible implementation manner, the processor is specifically configured to:

send an activation command for activating the backhaul link to the access device, so that the access device activates, according to the activation command, the backhaul link that is connected to the proxy device through the air interface.

On a basis of the first possible implementation manner, in a second possible implementation manner, the processor is specifically further configured to:

send a deactivation command to the access device, so that the access device deactivates, according to the deactivation command, the backhaul link that is connected to the proxy device through the air interface.

On a basis of the tenth aspect, in a third possible implementation manner, the processor is specifically further configured to:

send activation time information to the access device, where the activation time information includes an activation start time and a deactivation start time, so that the access device activates, according to the activation start time, the backhaul link that is connected to the proxy device through the air interface, and deactivates, according to the deactivation start time, the backhaul link that is connected to the proxy device through the air interface.

On a basis of the tenth aspect, in a fourth possible implementation manner, the processor is specifically further configured to:

send an activation command and an identifier of the access device to an intermediate device by using higher layer signaling, so that the intermediate device sends the activation command to the access device according to the identifier of the access device, so that the access device activates, according to the activation command, the backhaul link that is connected to the proxy device through the air interface.

On a basis of the fourth possible implementation manner, in a fifth possible implementation manner, the processor is specifically further configured to:

send the to-be-transmitted information to the intermediate device through the activated backhaul link, so that the intermediate device sends the to-be-transmitted information to the access device through the activated backhaul link; or receive, through the activated backhaul link, the to-be-transmitted information that comes from the access device and is forwarded by the intermediate device.

On a basis of the fourth and fifth possible implementation manners, in a sixth possible implementation manner, the processor is specifically further configured to:

send a deactivation command and the identifier of the access device to the intermediate device by using higher layer signaling, so that the intermediate device sends the deactivation command to the access device according to the identifier of the access device, so that the access device deactivates, according to the deactivation command, the backhaul link that is connected to the proxy device through the air interface.

According to an eleventh aspect, an embodiment of the present invention provides a proxy device, including a processor, configured to: determine that to-be-transmitted information needs to be transmitted through a backhaul link between the proxy device and an access device; and establish a signaling radio bearer SRB based backhaul link with the access device, and transmit the to-be-transmitted information through the signaling radio bearer SRB based backhaul link.

In a first possible implementation manner, the processor is specifically configured to: receive signaling radio bearer SRB configuration information from the access device by using higher layer signaling, or send the SRB configuration information to the access device, and establish the signaling radio bearer SRB based backhaul link with the access device.

According to a twelfth aspect, an embodiment of the present invention provides an access device, including a processor, configured to: determine that to-be-transmitted information needs to be transmitted through a backhaul link, where the backhaul link is a backhaul link that implements transmission between a proxy device and the access device through an air interface and is in a deactivated state; and activate the backhaul link, and transmit the to-be-transmitted information through the activated backhaul link.

In a first possible implementation manner, the processor is specifically configured to: send an activation request to the proxy device, so that the proxy device sends an activation command for activating the backhaul link to the access device; and activate, according to the activation command, the backhaul link that is connected to the proxy device through the air interface.

On a basis of the first possible implementation manner, in a second possible implementation manner, the processor is specifically further configured to: receive a deactivation command sent by the proxy device, and deactivate, according to the deactivation command, the backhaul link that is connected to the proxy device; or if it is determined that the activated backhaul link does not need to transmit to-be-transmitted information within a preset time, deactivate the backhaul link that is connected to the proxy device through the air interface.

In a third possible implementation manner, the processor is specifically further configured to: receive activation time information sent by the proxy device, where the activation time information includes an activation start time and a deactivation start time.

On a basis of the third possible implementation manner, in a fourth possible implementation manner, the processor is specifically further configured to: if it is determined that a current system time is the activation start time, activate the backhaul link that is connected to the proxy device through the air interface.

In a fifth possible implementation manner, the processor is specifically further configured to: receive, by using higher layer signaling, an activation command forwarded by an intermediate device; and activate, according to the activation command, the backhaul link that is connected to the proxy device through the air interface, where the activation command is sent by the proxy device to the intermediate device by using higher layer signaling.

On a basis of the fifth possible implementation manner, in a sixth possible implementation manner, the processor is specifically further configured to: send the to-be-transmitted information to the intermediate device through the activated backhaul link, so that the intermediate device sends the to-be-transmitted information to the proxy device through the activated backhaul link; or receive, through the activated backhaul link, the to-be-transmitted information that comes from the proxy device and is forwarded by the intermediate device.

On a basis of the fifth and sixth possible implementation manners, in a seventh possible implementation manner, the processor is specifically further configured to: receive, by using higher layer signaling, a deactivation command that is forwarded by the intermediate device, and deactivate, according to the deactivation command, the backhaul link that is connected to the proxy device through the air interface, where the deactivation command is sent by the proxy device to the intermediate device by using higher layer signaling.

According to a thirteenth aspect, an embodiment of the present invention provides an access device, including a processor, configured to: determine that to-be-transmitted information needs to be transmitted through a backhaul link between the access device and a proxy device; and establish a signaling radio bearer SRB based backhaul link with the proxy device, and transmit the to-be-transmitted information through the signaling radio bearer SRB based backhaul link.

In a first possible implementation manner, the processor is specifically configured to: receive signaling radio bearer SRB configuration information from the proxy device by using higher layer signaling, or send the SRB configuration information to the proxy device, and establish the signaling radio bearer SRB based backhaul link with the proxy device.

As may be known from the foregoing technical solutions, in the embodiments of the present invention, when to-be-transmitted information needs to be received or sent through a backhaul link, a proxy device activates the backhaul link in a deactivated state, establishes a transmission channel in the activated backhaul link, and receives or sends the to-be-transmitted information through the established transmission channel. Thereby, it may be implemented that the backhaul link is deactivated when to-be-transmitted information does not need to be received or sent through the backhaul link, and that the backhaul link is activated when to-be-transmitted information needs to be received or sent through the backhaul link. It can be implemented that in a scenario of dense deployment of small base stations, bearing pressure of an MME or an S-GW or a macro eNB is reduced by reducing activated S1 or X2 interfaces. The problem that existing backhaul links based on a large number of activated S1 or X2 interfaces consume a large number of memory resources, causing a transmission bottleneck in the backhaul links, may be solved.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various wireless communications systems, for example, a Global System for Mobile Communications (Global System for Mobile Communications, GSM for short) system, a General Packet Radio Service (General Packet Radio Service, GPRS for short) system, a Code Division Multiple Access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, or a Worldwide Interoperability for Microwave Access (Worldwide Interoperability for Microwave Access, WiMAX for short) system.

It should be noted that, in each embodiment of the present invention, a proxy device may be a network entity having a wired connection to an operator's core network or a neighboring base station, in various wireless communications systems. The proxy device includes a macro base station macro eNB, a local gateway, a small base station small base station, or other network elements.

In each embodiment of the present invention, an access device is a low power access point having a local gateway or not having a local gateway. The access device includes at least one of a small cell, a pico cell, and a home base station.

In each embodiment of the present invention, to-be-transmitted information includes at least one piece of control plane signaling (for example, S1-AP or X2-AP), synchronization information, and service information (for example, data of Internet services such as VoIP and FTP).

Figure 1:
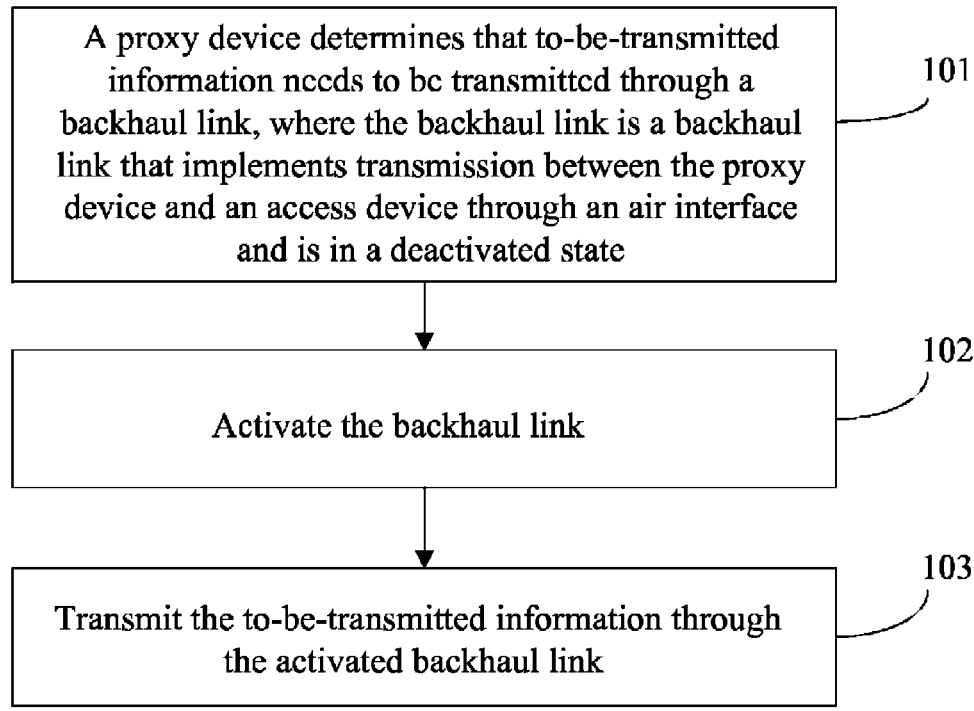
FIG. 1 is a schematic flowchart of a method for transmitting information through a backhaul link according to an embodiment of the present invention.

FIG. 1 is a schematic flowchart of a method for transmitting information through a backhaul link according to an embodiment of the present invention. As shown in FIG. 1, the method specifically includes:

101. A proxy device determines that to-be-transmitted information needs to be transmitted through a backhaul link, where the backhaul link is a backhaul link that implements transmission between the proxy device and an access device through an air interface and is in a deactivated state.

In an optional implementation manner of the present invention, before step 101, the backhaul link is established between the proxy device and the access device. The backhaul link includes but is not limited to an X2 or S1 air interface connection. It should be noted that, the air interface is a radio interface between the proxy device and the access device. With evolution of network architectures, a new interface, for example, an X3 interface or other interfaces, may be disposed between the proxy device and the access device. The backhaul link implements transmission through the air interface, so long as a protocol stack of the interface is borne over an air interface protocol stack (for example, a Packet Data Convergence Protocol (Packet Data Convergence Protocol, PDCP) layer, or a radio link control (Radio Link Control, RLC) layer, or a media access control (Media Access Control, MAC) layer, or a physical (Physical, PHY) layer). The process of establishing the backhaul link is the same as that in the prior art, and is not further described herein.

In an optional implementation manner of the present invention, to solve the problem that existing backhaul links based on a large number of activated air interfaces consume a large number of memory resources, causing a transmission bottleneck in the backhaul links in a scenario of dense deployment of small base stations, in the embodiment of the present invention, a system may set the backhaul link to the deactivated state by default, that is, after the backhaul link establishment is complete, the link is in the deactivated state. Before the backhaul link is activated, a default setting is that the backhaul link cannot be used to transmit the to-be-transmitted information.

102. Activate the backhaul link.

In an optional implementation manner of the present invention, the activating the backhaul link includes:

sending, by the proxy device, an activation command for activating the backhaul link to the access device, so that the access device activates, according to the activation command, the backhaul link that is connected to the proxy device through the air interface. In specific implementation, a transmission channel for information transmission in the backhaul link may be activated. For example, an air interface connection to the proxy device or a transmission mode (for example, an SCTP bearer) is activated.

In an optional implementation manner of the present invention, before the proxy device determines that the to-be-transmitted information needs to be transmitted through the backhaul link, the method includes:

sending, by the proxy device, activation time information to the access device, where the activation time information includes an activation start time and a deactivation start time, so that the access device sets the activation start time and the deactivation start time according to the activation time information, and activates, at the activation start time, the backhaul link that is connected to the proxy device through the air interface, and deactivates, at the deactivation start time, the backhaul link that is connected to the proxy device through the air interface.

In an actual application, considering limited network resources, when a channel state of the backhaul link between the proxy device and the access device is poor, to ensure reliability of data transmission, in an optional implementation manner of the present invention, the activating the backhaul link includes:

sending, by the proxy device, an activation command and an identifier of the access device to an intermediate device by using higher layer signaling, so that the intermediate device sends the activation command to the access device according to the identifier of the access device, so that the access device activates, according to the activation command, the backhaul link that is connected to the proxy device through the air interface.

103. Transmit the to-be-transmitted information through the activated backhaul link.

To solve the transmission bottleneck in the backhaul link, in an optional implementation manner of the present invention, after transmitting the to-be-transmitted information through the activated backhaul link, the method includes:

sending, by the proxy device, a deactivation command to the access device, so that the access device deactivates, according to the deactivation command, the backhaul link that is connected to the proxy device through the air interface.

In an optional implementation manner of the present invention, if an intermediate device is used for forwarding in the backhaul link activated in step 102, the transmitting the to-be-transmitted information through the activated backhaul link includes:

sending, by the proxy device, the to-be-transmitted information to the intermediate device through the activated backhaul link, so that the intermediate device sends the to-be-transmitted information to the access device through the activated backhaul link; or receiving, through the activated backhaul link, the to-be-transmitted information that comes from the access device and is forwarded by the intermediate device.

To solve the transmission bottleneck in the backhaul link, after transmitting the to-be-transmitted information through the activated backhaul link, the method includes:

sending, by the proxy device, a deactivation command and the identifier of the access device to the intermediate device by using higher layer signaling, so that the intermediate device sends the deactivation command to the access device according to the identifier of the access device, so that the access device deactivates, according to the deactivation command, the backhaul link that is connected to the proxy device through the air interface.

In the embodiment of the present invention, when to-be-transmitted information needs to be received or sent through a backhaul link, a proxy device activates the backhaul link in a deactivated state, and receives or sends the to-be-transmitted information through the activated backhaul link; and when to-be-transmitted information does not need to be received or sent through the backhaul link, the backhaul link is deactivated. It can be implemented that in a scenario of dense deployment of small base stations, bearing pressure of an MME or an S-GW or a macro eNB is reduced by reducing the number of activated backhaul links. The problem that existing backhaul links based on a large number of activated S1 or X2 interfaces consume a large number of memory resources, causing a transmission bottleneck in the backhaul links, may be solved.

Figure 2:
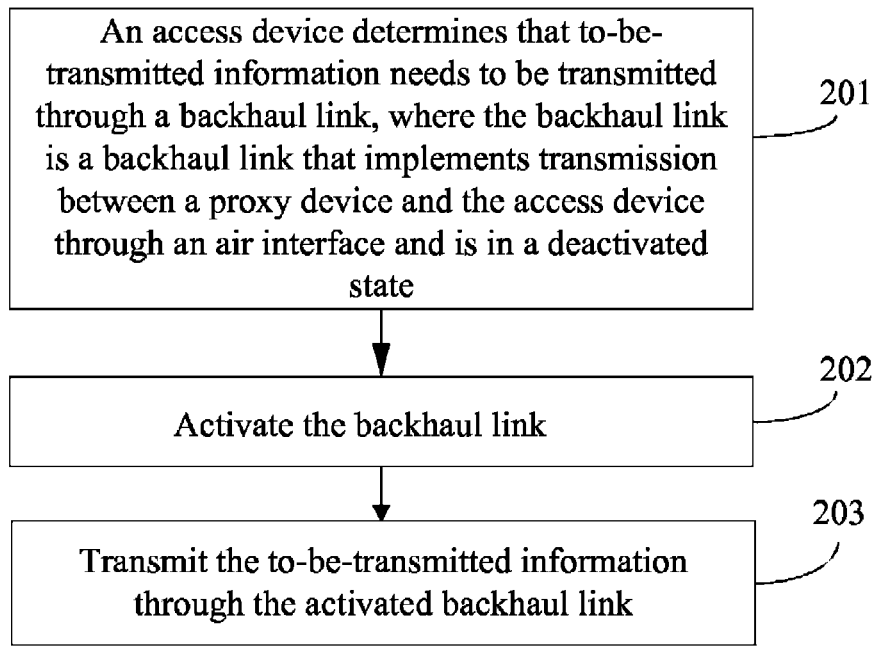
FIG. 2 is a schematic flowchart of a method for transmitting information through a backhaul link according to another embodiment of the present invention.

FIG. 2 is a schematic flowchart of a method for transmitting information through a backhaul link according to another embodiment of the present invention. As shown in FIG. 2, the method specifically includes:

201. An access device determines that to-be-transmitted information needs to be transmitted through a backhaul link, where the backhaul link is a backhaul link that implements transmission between a proxy device and the access device through an air interface and is in a deactivated state.

In an optional implementation manner of the present invention, before step 201, the backhaul link is established between the proxy device and the access device. The backhaul link includes but is not limited to an X2 or S1 air interface connection. With evolution of network architectures, a new interface, for example, an X3 interface or other interfaces, may be disposed between the proxy device and the access device. The backhaul link implements transmission through the air interface, so long as a protocol stack of the interface is borne over an air interface protocol stack (for example, a Packet Data Convergence Protocol (Packet Data Convergence Protocol, PDCP) layer, or a radio link control (Radio Link Control, RLC) layer, or a media access control (Media Access Control, MAC) layer, or a physical (Physical, PHY) layer). The process of establishing the backhaul link is the same as that in the prior art, and is not further described herein.

In an optional implementation manner of the present invention, to solve the problem that existing backhaul links based on a large number of activated air interfaces consume a large number of memory resources, causing a transmission bottleneck in the backhaul links in a scenario of dense deployment of small base stations, in the embodiment of the present invention, a system may set the backhaul link to the deactivated state by default, that is, after the backhaul link establishment is complete, the link is in the deactivated state. Before the backhaul link is activated, a default setting is that the backhaul link cannot be used to transmit the to-be-transmitted information.

202. Activate the backhaul link.

In an optional implementation manner of the present invention, the activating the backhaul link includes:

sending, by the access device, an activation request to the proxy device, so that the proxy device sends an activation command for activating the backhaul link to the access device; and activating, by the access device according to the activation command, the backhaul link that is connected to the proxy device through the air interface.

In an optional implementation manner of the present invention, before the access device determines that the to-be-transmitted information needs to be transmitted through the backhaul link, the method includes:

receiving, by the access device, activation time information sent by the proxy device, where the activation time information includes an activation start time (a backhaul link between a macro eNB and a small base station is activated at the activation start time, and the to-be-transmitted information is transmitted in the activated backhaul link) and a deactivation start time (the backhaul link between the macro eNB and the small base station is deactivated at the deactivation start time, but the to-be-transmitted information cannot be transmitted in the backhaul link); and setting the activation start time and the deactivation start time according to the activation time information.

The activating the backhaul link includes:

if it is determined that a current system time is the activation start time, activating, by the access device, the backhaul link that is connected to the proxy device through the air interface.

The deactivating the backhaul link includes:

if it is determined that a current system time is the deactivation start time, deactivating, by the access device, the backhaul link that is connected to the proxy device through the air interface.

In an optional implementation manner of the present invention, the activating the backhaul link includes:

receiving, by the access device by using higher layer signaling, an activation command forwarded by an intermediate device; and activating, according to the activation command, the backhaul link that is connected to the proxy device through the air interface, where the activation command is sent by the proxy device to the intermediate device by using higher layer signaling.

203. Transmit the to-be-transmitted information through the activated backhaul link.

To solve the transmission bottleneck in the backhaul link, in an optional implementation manner of the present invention, after transmitting the to-be-transmitted information through the activated backhaul link, the method includes:

receiving, by the access device, a deactivation command sent by the proxy device, and deactivating, according to the deactivation command, the backhaul link that is connected to the proxy device through the air interface; or when it is determined that the backhaul link does not transmit information within a preset time, deactivating, by the access device, the backhaul link that is connected to the proxy device through the air interface.

In an optional implementation manner of the present invention, if in step 202, an intermediate device is used for forwarding in the backhaul link between the access device and the proxy device, the transmitting the to-be-transmitted information through the activated backhaul link includes:

sending, by the access device, the to-be-transmitted information to the intermediate device through the activated backhaul link, so that the intermediate device sends the to-be-transmitted information to the proxy device through the activated backhaul link; or receiving, through the activated backhaul link, the to-be-transmitted information that comes from the proxy device and is forwarded by the intermediate device.

To solve the transmission bottleneck in the backhaul link, the access device receives, by using higher layer signaling, a deactivation command that is forwarded by the intermediate device, and deactivates, according to the deactivation command, the backhaul link that is connected to the proxy device through the air interface, where the deactivation command is sent by the proxy device to the user equipment by using higher layer signaling; or when it is determined that the backhaul link does not transmit information within a preset time, the access device may deactivate the backhaul link that is connected to the proxy device through the air interface.

In this embodiment, when to-be-transmitted information needs to be received or sent through a backhaul link, an access device may activate the backhaul link in a deactivated state, and transmit information through the activated backhaul link; and when to-be-transmitted information does not need to be received or sent through the backhaul link, the access device deactivates the backhaul link. It can be implemented that in a scenario of dense deployment of small base stations, bearing pressure of an MME or an S-GW or a macro eNB is reduced by reducing the number of activated backhaul links. The problem that existing backhaul links based on a large number of activated S1 or X2 interfaces consume a large number of memory resources, causing a transmission bottleneck in the backhaul links, may be solved.

Figure 3:
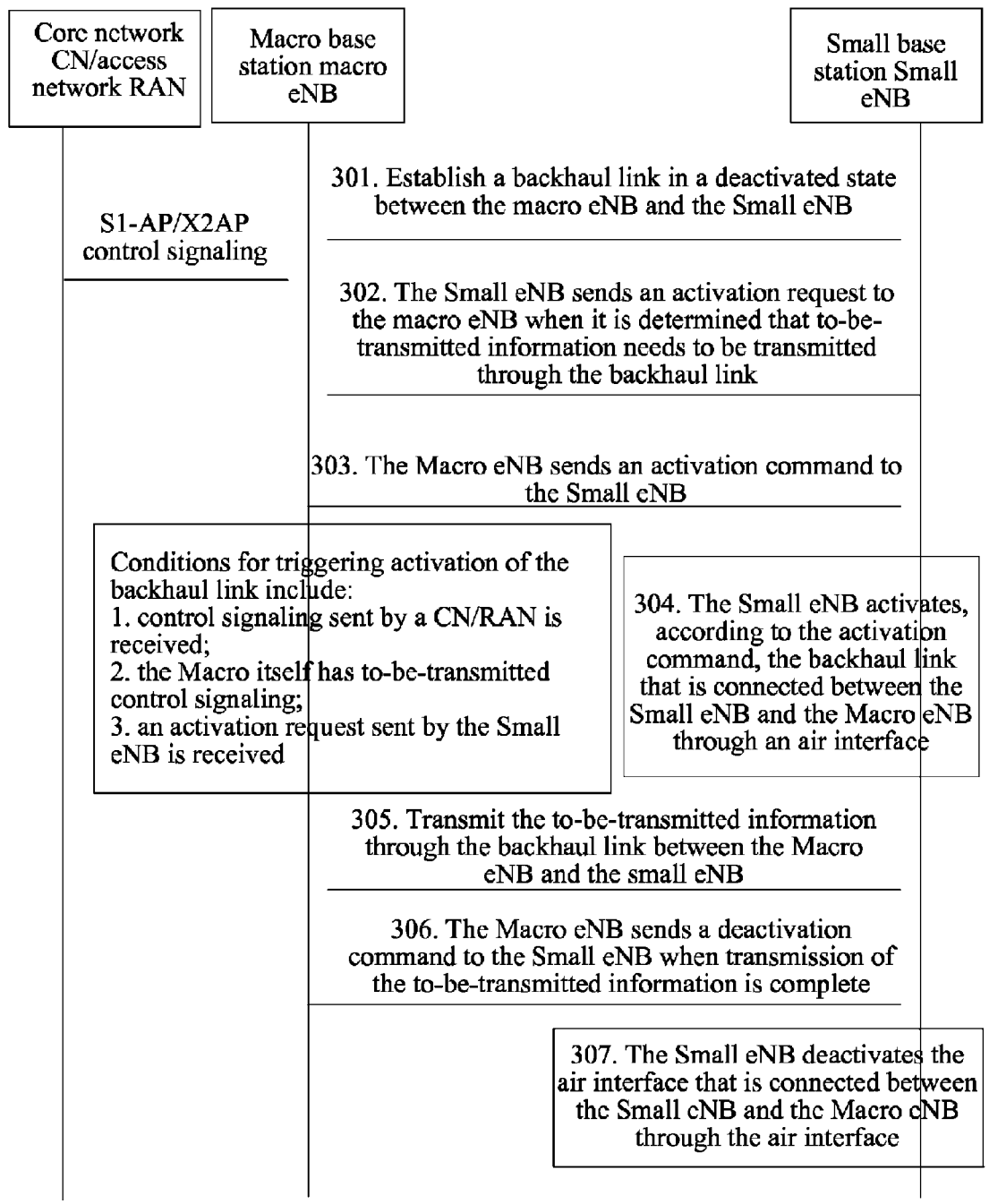
FIG. 3 is a signaling flowchart of a method for transmitting information through a backhaul link according to another embodiment of the present invention.

FIG. 3 is a signaling flowchart of a method for transmitting information through a backhaul link according to another embodiment of the present invention. An example in which a macro eNB is a proxy device and a small base station is an access device is used for description. The two entities are only examples in the embodiment of the present invention. Devices in the present invention include but are not limited to the foregoing entities. The following describes in detail a specific process of dynamically activating a backhaul link between the macro eNB and the small base station to implement the method for transmitting information through the backhaul link. As shown in FIG. 3, the method specifically includes:

301. Establish a backhaul link in a deactivated state between the macro eNB and the small base station.

The process of establishing the backhaul link is the same as that in the prior art. Using a process of establishing an X2 air interface connection as an example for brief description, the process in specific implementation may be as follows:

After the small base station is powered on, the small base station establishes a radio resource control (Radio Resource Control, RRC for short) connection to the macro eNB; the small base station sends an X2 setup request (X2 SETUP REQUEST) to the macro eNB; the macro eNB returns an X2 setup response (X2 SETUP RESPONSE) to the small base station, where the response message carries a backhaul link identifier allocated by the macro eNB to the small base station, where the backhaul link identifier is used to identify an interface of the backhaul link between the macro eNB and the small base station, and the backhaul link identifier includes but is not limited to a cell radio network temporary identifier (Cell Radio Network Temporary Identifier, C-RNTI).

After establishment of the air interface connection (a radio interface between the macro eNB and the small base station) is complete, the air interface connection may be used to bear, on the air interface, information transmitted in the backhaul link, where the information (for example, control signaling) transmitted in the backhaul link may be encapsulated in a data radio bearer (Data Radio Bearer, DRB) of the air interface for transmission, where the information transmitted in the backhaul link may be identified by a C-RNTI identifier allocated by the macro eNB to the small base station.

It should be noted that, to solve the problem that existing backhaul links based on a large number of activated air interfaces consume a large number of memory resources, causing a transmission bottleneck in the backhaul links in a scenario of dense deployment of small base stations, in the embodiment of the present invention, a system may set the backhaul link to the deactivated state by default, that is, after the backhaul link establishment is complete, the link is in the deactivated state. Before the backhaul link is activated, a default setting is that the backhaul link cannot be used to transmit to-be-transmitted information. That is, the backhaul link between the macro and the small base station has corresponding backhaul link configuration information (for example, configuration information of an X2 interface), but to-be-transmitted information such as control signaling or synchronization information or service information cannot be transmitted in the backhaul link.

302. The small base station sends an activation request to the macro eNB when it is determined that to-be-transmitted information needs to be transmitted through the backhaul link.

Assuming that the small base station has to-be-transmitted information (for example, S1-AP or X2-AP information) that needs to be transmitted, the small base station sends an activation request to the macro eNB, where the activation request includes but is not limited to a backhaul link identifier, for example, may further include an information type identifier and an identifier of the access device.

The backhaul link identifier is used to identify the interface of the to-be-activated backhaul link. Specifically, the backhaul link identifier may carry interface information of the to-be-activated backhaul link, for example, carry a GUMMEI, indicating an S1 interface, carry a Global eNB ID (small base station), indicating an X2 interface, carry a global eNB id (small base station) <-> GUMMEI, indicating an S1 interface, or carry a global eNB id (small base station) <-> global eNB id (macro), indicating an X2 interface; or a special bit may be directly defined, for example, 1 bit may be used as an indication, where 0 indicates S1 and 1 indicates X2; for example, 2 bits are used, where 00 indicates S1, 01 indicates X2, and 10 indicates X3.

It should be noted that, the identifier of the access device is used to identify the access device corresponding to the to-be-activated backhaul link; if the interface information of the to-be-activated backhaul link already includes the identifier of the access device (for example, an identifier of the small base station), the identifier of the access device does not need to be carried separately again.

The information type identifier is used to identify the type of to-be-transmitted information. In an actual application, if multiple small base stations request to activate X2 interfaces, and the number of X2 interfaces already reaches an upper limit that the macro eNB can bear, the macro eNB sequences to-be-activated small base stations according to the type of the to-be-transmitted information, and performs activation according to the sequence. In specific implementation, the type of each piece of to-be-transmitted information and a corresponding activation priority may be preset, for example, an activation priority corresponding to an information type of a handover request message is higher than an activation priority corresponding to an information type of a cell load message. If the number of X2 interfaces for transmitting the to-be-transmitted information already reaches the upper limit that the macro eNB can bear, the macro eNB may preferentially send an activation command to a small base station corresponding to an X2 interface transmitting the handover request message, so that the small base station corresponding to the X2 interface transmitting the handover request message preferentially activates a corresponding backhaul link.

It should be noted that, in an actual application, the information type identifier may be carried in the to-be-transmitted information. For example, on an S1 interface, there are 36 uplink S1 messages in total from the small base station to the macro eNB or a core network node, where at least 6 bits are used to indicate types of the uplink S1 messages. With evolution of network architectures, a new uplink S1 message may be added to the uplink S1 messages, where a method for identifying the message type is similar. For another example, there are 14 pieces of uplink signaling in total on an X2 interface, where at least 4 bits are used to indicate types of the uplink signaling. With evolution of network architectures, new signaling may be added to the uplink signaling, where a method for identifying the message type is similar.

It should be noted that, the small base station may transmit an activation request to the macro eNB by using higher layer signaling or physical layer signaling.

The higher layer signaling may be an information element (Information Element, IE for short) in an RRC message, where the RRC message may be an RRC message in the prior art, for example, an RRC connection reconfiguration (RRC CONNECTION RECONFIGURATION) message, which is not limited by this embodiment. The IE in the existing RRC message is extended to carry the foregoing configuration information. The RRC message may also be different from the existing RRC message in the prior art, or a new IE message may be defined, for example, a backhaul link activation request message.

Because QoS required for transmitting the activation request is slightly different from that of the RRC signaling and non-access stratum (NAS) signaling in the prior art, the higher layer signaling may be a defined SRBx; or an SRB2 whose QoS is the most similar to that of the higher layer signaling may be reused for the higher layer signaling; or the higher layer signaling may be a message to which a new media access control (Media Access Control, MAC for short) control element (Control Element, CE for short) is added; or the higher layer signaling may be a new MAC CE that is defined. Table 1 is a format of a new MAC CE defined in this embodiment:

TABLE 1

| S1/X2/X3 | Identifier of a to-be-transmitted message (type) | Oct 1 |

As shown in Table 1, the new MAC CE has eight bits in total. In specific implementation, the two highest bits of the new MAC CE may be used to indicate a backhaul link identifier, that is, used to identify an interface of the to-be-activated backhaul link, for example, S1/X2 or a new interface X3, where 00 indicates S1, 01 indicates X2, 10 indicates the X3 interface, and 11 is reserved; the other six bits are used to indicate an information type identifier and used to identify the type of the to-be-transmitted information. Using a process of managing an E-RAB including four pieces of signaling as an example, the type of an E-RAB SETUP RESPONSE may be numbered 1, that is, 000001 if indicated by using the last six bits in the foregoing MAC CE; the type of an E-RAB MODIFY RESPONSE may be numbered 2, that is, 000010 if indicated by using the last six bits in the foregoing MAC CE; the type of an E-RAB RELEASE RESPONSE may be numbered 3, that is, 000011 if indicated by using the last six bits in the foregoing MAC CE; and the type of an E-RAB RELEASE INDICATION may be numbered 4, that is, 000100 if indicated by using the last six bits in the foregoing MAC CE. It should be noted that, specific serial numbers of different signaling may be different from the serial numbers in the foregoing example, but the method is similar.

As may be known from this description, according to different bits in the foregoing new MAC CE, the interface type of the to-be-activated backhaul link and the type of the to-be-transmitted information may be identified. For example, if bits in the MAC CE are 00000001, the interface of the to-be-activated backhaul link may be identified as an S1 interface; for a message whose information type is numbered 000001, the to-be-transmitted information may be identified as an E-RAB SETUP RESPONSE message.

For another example, for higher layer signaling, the type of the activated interface may be specifically further indicated by using a MAC CE. Specific names of the foregoing S1/X2/X3 messages are encapsulated in a MAC packet data unit (Packet Data Unit, PDU) in which the MAC CE is located. For another example, for physical layer signaling, specifically, the macro eNB may be requested, by using different levels, for example, +1/0/−1, of a scheduling request (Scheduling Request, SR), to activate different interfaces, for example, a level value +1 of the SR identifies a request for activating the X2 interface.

For another example, for physical layer signaling, specifically a special SR may be used to periodically request the macro eNB to activate an interface corresponding to the identifier of the to-be-activated backhaul link. Currently a transmission period of the SR has several fixed values, that is, different values such as 1, 2, 5, 10, 20, 40, and 80 ms. For example, an SR with a period of 4 is used to indicate that the macro eNB is requested to activate the X2 interface.

303. The macro eNB sends an activation command to the small base station.

It should be noted that, in an actual application, as shown in FIG. 3, for example, when the macro eNB receives control signaling (for example, S1-AP/X2 AP control signaling) that is delivered by a core network CN or another radio access network RAN (for example, a neighboring base station) to the small base station, or control signaling that is generated by the macro eNB itself, the macro eNB may also send an activation command to the small base station.

304. The small base station activates, according to the activation command, the backhaul link that is connected between the small base station and the macro eNB through an air interface.

305. Transmit the to-be-transmitted information through the backhaul link between the macro eNB and the small base station.

After the macro eNB and the small base station separately activate the corresponding backhaul link, the backhaul link between the macro eNB and the small base station not only has corresponding backhaul link configuration information, but also may transmit control signaling or other information that needs to be transmitted, for example, synchronization information or service information.

306. The macro eNB sends a deactivation command to the small base station when transmission of the to-be-transmitted information is complete.

307. The small base station deactivates the air interface that is connected between the small base station and the macro eNB through the air interface.

After receiving the deactivation command sent by the macro eNB, the small base station may deactivate the backhaul link that is connected between the small base station and the macro eNB through the air interface; or if the small base station determines that the activated backhaul link has no information to transmit within a preset time, the small base station deactivates the backhaul link that is connected between the small base station and the macro eNB through the air interface, and does not use the backhaul link to transmit information with the macro eNB.

In this embodiment, when to-be-transmitted information needs to be transmitted through a backhaul link, a macro eNB sends an activation command and activates the backhaul link; and when to-be-transmitted information does not need to be transmitted through the backhaul link, the backhaul link is deactivated by using a deactivation command sent by the macro eNB or when a Small eNB determines that the activated backhaul link has no information to transmit within a preset time, the backhaul link is deactivated. It can be implemented that in a scenario of dense deployment of small base stations, bearing pressure of a macro eNB is reduced by reducing activated backhaul links. The problem that existing backhaul links based on a large number of activated S1 or X2 interfaces consume a large number of memory resources, causing a transmission bottleneck in the backhaul links, may be solved.

Figure 4:
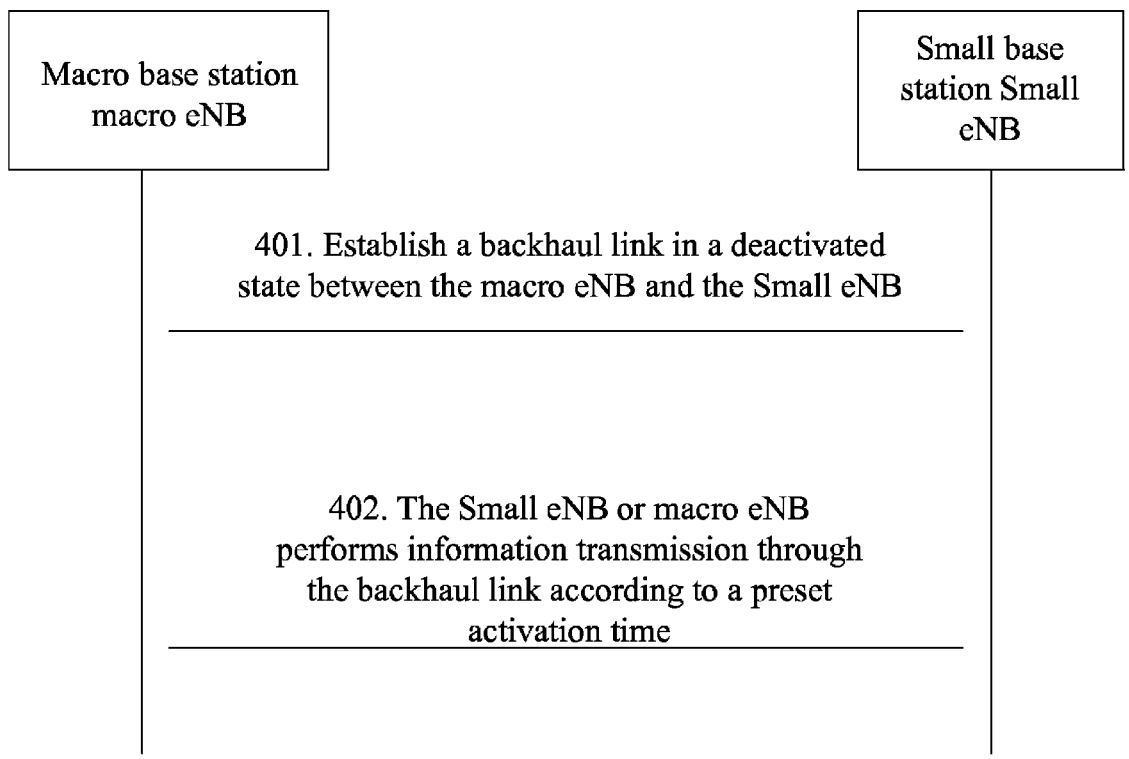
FIG. 4 is a signaling flowchart of a method for transmitting information through a backhaul link according to another embodiment of the present invention.

FIG. 4 is a signaling flowchart of a method for transmitting information through a backhaul link according to another embodiment of the present invention. Assuming that a macro eNB is a proxy device and that a small base station is an access device, the following describes in detail a specific process of activating a backhaul link between the macro eNB and the small base station in a time division manner to implement the method for transmitting information through the backhaul link. As shown in FIG. 4, the method specifically includes:

401. Establish a backhaul link in a deactivated state between the macro eNB and the small base station.

In this embodiment, a specific implementation process of establishing the backhaul link in the deactivated state between the macro eNB and the small base station is similar to step 301 in the embodiment shown in FIG. 3. A difference lies in that when the backhaul link is established, the macro eNB sends activation time information to the small base station, so that the small base station sets an activation time and a deactivation time according to the activation time information.

It should be noted that, the activation time information may use time segment information or discontinuous reception information.

The small base station sets, according to the activation time information, the activation time and the deactivation time of the backhaul link that is connected to the macro eNB through an air interface, where the setting in specific implementation may be as follows:

If the activation time information is the time segment information, configured time segment parameters may be a start time of a time segment and duration of the time segment. The small base station directly obtains the start time and duration of the time segment by using the configured time segment parameters. Alternatively, the configured time segment parameters may also be the duration of the time segment and a parameter N, where N is the number of air interfaces that are allowed to be established. The small base station directly obtains the duration of the segment by using the configured time segment parameters. For the start time of the time segment, for example, the small base station performs a modulo operation according to base station identifier information of the small base station and the number N of air interfaces that are allowed to be established, and obtains, by calculation, the start time of the time segment used by the small base station. The small base station may activate the corresponding backhaul link according to the obtained start time of the time segment, and deactivate the corresponding backhaul link when the duration of the segment ends.

If the activation time information is a discontinuous reception (Discontinuous Reception, DRX) mode, the configured parameters are a DRX mechanism related parameter and a timer, which are the same as UE DRX mechanism configuration parameters in the prior art, and are not further described.

It should be noted that, to solve the problem that existing backhaul links based on a large number of activated air interfaces consume a large number of memory resources, causing a transmission bottleneck in the backhaul links in a scenario of dense deployment of small base stations, in the embodiment of the present invention, a system may set the backhaul link to the deactivated state by default, that is, after the backhaul link establishment is complete, the link is in the deactivated state. Before the backhaul link is activated, a default setting is that the backhaul link cannot be used to transmit to-be-transmitted information. That is, the backhaul link between the macro and the small base station has corresponding backhaul link configuration information (for example, configuration information of an X2 interface), but to-be-transmitted information such as control signaling or synchronization information or service information cannot be transmitted in the backhaul link.

402. The small base station or macro eNB performs information transmission through the backhaul link according to a preset activation time.

In specific implementation, for example, if it is determined that a current system time is the preset activation start time, the small base station activates the backhaul link between the small base station and the macro eNB, and transmits information through the activated backhaul link.

In this embodiment, an activation time is preset between a macro eNB and a small base station; a backhaul link between the macro eNB and the small base station is activated at the preset activation start time; and the backhaul link between the macro eNB and the small base station is deactivated at a preset deactivation start time. It may be implemented that when multiple small base stations need to send information to the macro eNB, each small base station activates a corresponding backhaul link according to its corresponding activation time, and performs information transmission. Thereby, bearing pressure of the macro eNB may be reduced, and a transmission bottleneck in the backhaul link is avoided.

Figure 5:
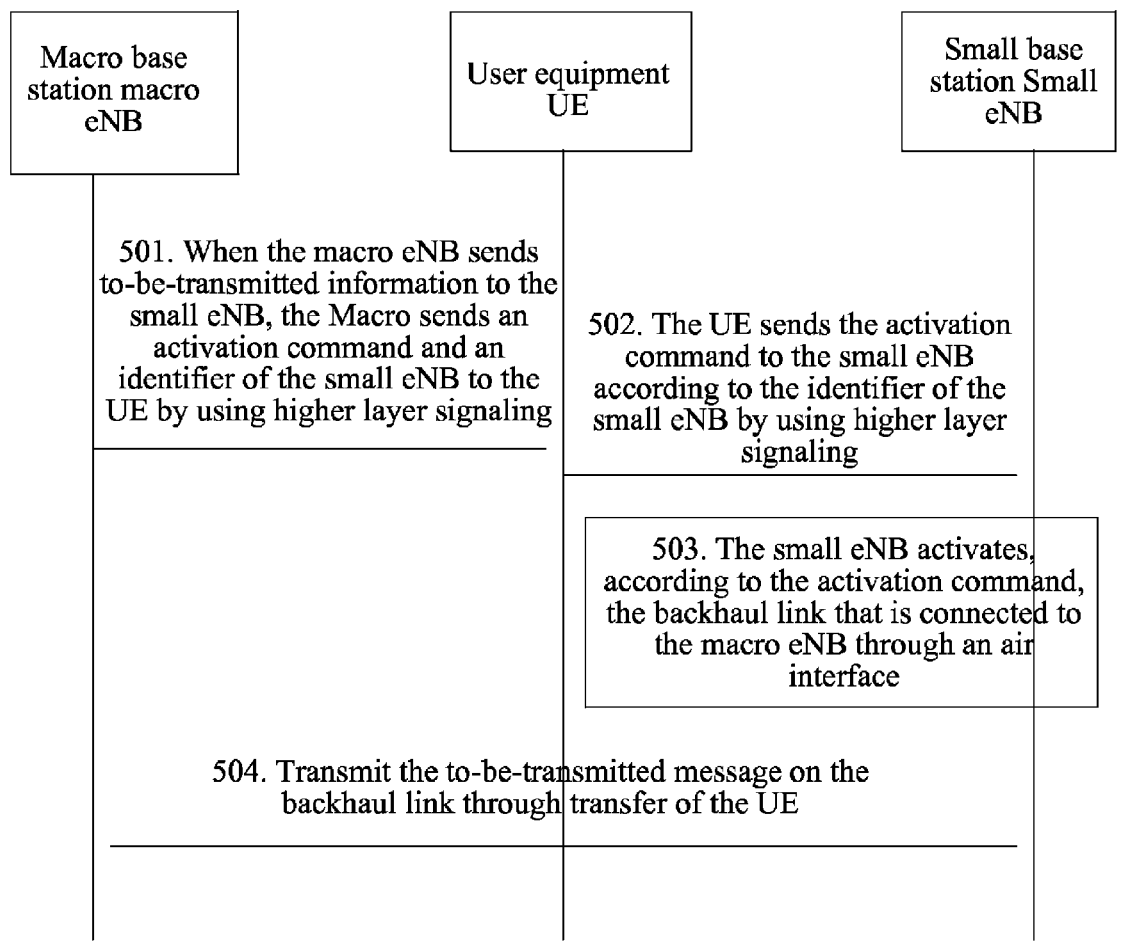
FIG. 5 is a signaling flowchart of a method for transmitting information through a backhaul link according to another embodiment of the present invention.

FIG. 5 is a signaling flowchart of a method for transmitting information through a backhaul link according to another embodiment of the present invention. This embodiment is described by using an example in which a macro eNB is a proxy device, a small base station is an access device, and a user equipment UE is an intermediate device. The foregoing entities are only an example of the present invention, and the present invention includes but is not limited to the foregoing entities. The following describes in detail a specific process of activating the backhaul link between the macro eNB and the small base station by using the UE to implement the method for transmitting information through the backhaul link. As shown in FIG. 5, the method specifically includes:

501. When the macro eNB sends to-be-transmitted information to the small base station, the macro base station sends an activation command and an identifier of the small base station to the UE by using higher layer signaling.

It should be noted that, before step 501, a backhaul link in a deactivated state is already established between the macro eNB and the small base station. For the specific establishment process, reference is made to the related description in step 301 in the embodiment shown in FIG. 3.

The foregoing UE is a UE that is covered by both the small base station and the macro eNB and is selected by the macro eNB according to UE capabilities, a UE measurement result, and UE location information; and the selected UE is in a connected state, where the UE capabilities may support simultaneous communication with the macro eNB and the small base station.

If the macro eNB and the small base station are deployed on a same frequency, the UE may be a single-mode UE; in this case, the UE can only perform communication with one of the macro eNB and the small base station at the same time. If the macro eNB and the small base station are deployed on different frequencies, the UE needs to be a dual-mode UE; in this case, the UE can perform communication with the macro eNB and the small base station at the same time, or can only perform communication with one of the macro eNB and the small base station at the same time.

It should be noted that, when the small base station sends the to-be-transmitted information to the macro eNB, the small base station may send an activation request and an identifier of the macro eNB to the UE by using higher layer signaling. The UE sends the activation request to the macro eNB according to the identifier of the macro eNB by using higher layer signaling, so that the macro eNB sends an activation command to the small base station through the UE according to the activation request.

502. The UE sends the activation command to the small base station according to the identifier of the small base station by using higher layer signaling.

If no RRC connection is established between the UE and the small base station, the UE needs to initiate an RRC connection to the small base station and establish an air interface SRB for transmitting the activation command. The UE may transmit the activation command in an RRC connection setup request message or an RRC connection setup complete message.

503. The small base station activates, according to the activation command, the backhaul link that is connected to the macro eNB through an air interface.

The macro eNB or small base station separately activates a corresponding air interface to activate the backhaul link. A transmission channel may be established in the backhaul link between the macro eNB and the small base station, where the transmission channel may use an existing SCTP transmission mode or the foregoing SRB transmission mode or other transmission modes.

504. Transmit the to-be-transmitted message in the activated backhaul link through the UE.

In specific implementation, the macro eNB sends the to-be-transmitted information to the UE through the activated backhaul link by using higher layer signaling, and the UE sends the to-be-transmitted information to the small base station through the activated backhaul link by using higher layer signaling; or the small base station sends the to-be-transmitted information to the UE through the activated backhaul link by using higher layer signaling, and the UE sends the to-be-transmitted information to the macro eNB through the activated backhaul link by using higher layer signaling.

For the higher layer signaling, specifically the activation command, the identifier of the small base station, or the to-be-transmitted information may be carried by an information element IE in an RRC message, where the RRC message may be an RRC message in the prior art, for example, an RRC connection reconfiguration message, which is not limited by this embodiment. The IE in the existing RRC message is extended to carry the configuration information, or the RRC message may be different from the existing RRC message in the prior art.

It should be noted that, in this embodiment, in the foregoing step 501, the macro eNB may send the to-be-transmitted information with the activation command and the identifier of the small base station to the UE, or the macro eNB may send the to-be-transmitted information to the UE after the UE sends the activation command to the small base station.

It should be noted that, after transmission of the to-be-transmitted information is complete, the small base station may release the RRC connection with the UE, or the small base station may reserve the RRC connection with the UE, but the RRC connection may be in a discontinuous reception DRX state (for example, in an architecture in which a macro base station and a small base station are coupled, the small base station always keeps the RRC connection with the UE).

It should be noted that, after transmission of the to-be-transmitted information is complete, the small base station may deactivate, according to a deactivation command that comes from the macro eNB and is forwarded by the UE, the backhaul link that is connected to the macro eNB through the air interface; or if the small base station determines that the backhaul link does not transmit information within a preset time, the small base station deactivates the backhaul link that is connected to the macro eNB through the air interface; or the macro eNB notifies the small base station, by using an RRC connection release message, to perform an operation of deactivating the backhaul link.

In this embodiment, when to-be-transmitted information does not need to be transmitted through a backhaul link, the backhaul link is in a deactivated state; and when to-be-transmitted information needs to be transmitted through the backhaul link, a macro eNB sends an activation command to a small base station through a UE covered by both the macro eNB and the small base station, to activate the backhaul link between the macro eNB and the small base station; and information transmission is performed in the activated backhaul link through the UE. By using the technical means, it can be implemented that in a scenario of dense deployment of small base stations, bearing pressure of an MME or an S-GW or a macro eNB is reduced by reducing activated backhaul links. The problem that existing backhaul links based on a large number of activated S1 or X2 interfaces consume a large number of memory resources, causing a transmission bottleneck in the backhaul links, may be solved.

In addition, when a channel state of a backhaul link between a proxy device and an access device is poor, or an access device is incapable of accessing a proxy device, a UE is used as an intermediate device to perform activation and deactivation of the backhaul link, which may ensure reliability of information transmission.

Figure 6:
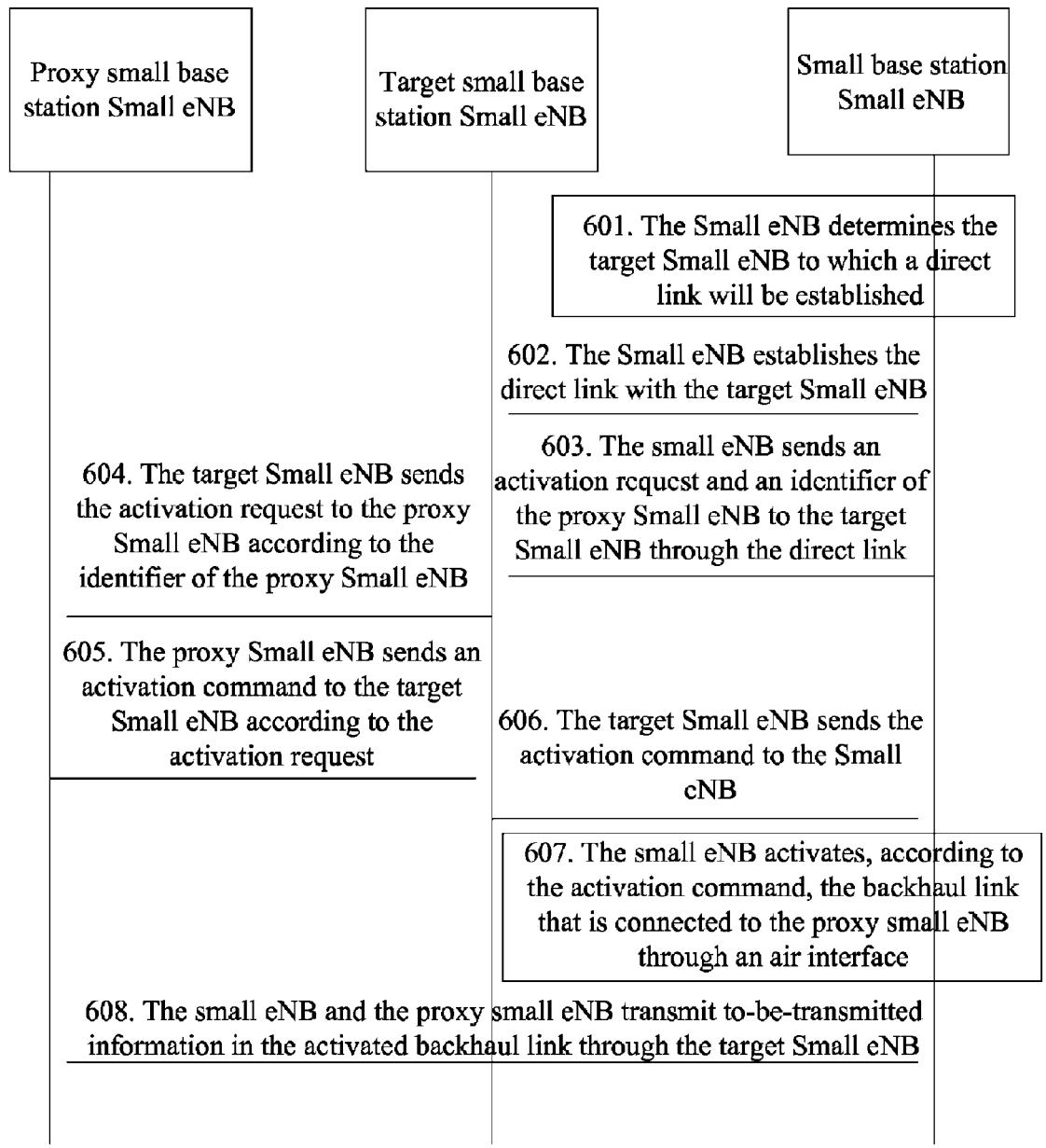
FIG. 6 is a signaling flowchart of a method for transmitting information through a backhaul link according to another embodiment of the present invention.

FIG. 6 is a signaling flowchart of a method for transmitting information through a backhaul link according to another embodiment of the present invention. Assuming that a proxy small base station is a proxy device, that a small base station is an access device, and that a target small base station is an intermediate device, the following describes in detail a specific process of activating a backhaul link by the small base station or proxy small base station separately through a direct link established with the target small base station so as to implement the method for transmitting information through the backhaul link. As shown in FIG. 6, the method specifically includes:

601. The small base station determines the target small base station to which a direct link is to be established.

The target small base station may be a proxy small base station that is used as a proxy device, or may be another small base station that can be routed to the proxy small base station.

Assuming that the target small base station is another small base station that is routed to the proxy small base station, before step 601, a backhaul link in a deactivated state is already established between the proxy small base station and the small base station. For the specific establishment process, reference is made to the related description in step 301 in the embodiment shown in FIG. 3. When the small base station needs to transmit to-be-transmitted information through the backhaul link between the small base station and the proxy small base station, the small base station needs to determine the target small base station to which the direct link is to be established.

In specific implementation, the small base station may determine, by means of search, for example, measuring signal quality of neighboring cells, the target small base station to which the direct link is to be established, or a macro base station macro eNB may configure the target small base station to which the direct link is to be established.

602. The small base station establishes the direct link with the target small base station.

In specific implementation, the small base station directly initiates an RRC connection setup request to the target small base station. The request message carries direct link setup request information. After receiving the direct link setup request information, the target small base station establishes the direct link between the target small base station and the small base station.

If coverage of the small base station overlaps that of a macro network, a direct link between small base stations may also be controlled and transferred by a macro eNB within the same coverage. Specifically, the small base station initiates an RRC connection setup request to the macro eNB. The request message carries direct link setup information and an identifier of the target small base station. After receiving the message, the macro eNB determines whether to allow a direct link to be established between the two small base stations. If it is allowed, the macro eNB may forward the request message to the target small base station. The target small base station establishes an RRC connection to the small base station after receiving the message. After establishment of the RRC connection is complete, the two small base stations may perform transmission through the macro eNB. It should be noted that, if no overlapped coverage of the macro network or the like exists, the small base station is deployed independently. In this case, a direct link resource is a direct link resource statically configured between the small base stations, or a device-to-device (D2D) resource dynamically coordinated between the small base stations. If overlapped coverage of the macro network or the like exists, the macro network controls allocation of a direct link resource of the small base station.

603. The small base station sends an activation request and an identifier of the proxy small base station to the target small base station through the direct link.

It should be noted that, assuming that the target small base station is a proxy small base station, the small base station transmits the to-be-transmitted information to the proxy small base station directly through the direct link.

604. The target small base station sends the activation request to the proxy small base station according to the identifier of the proxy small base station.

It should be noted that, the target small base station may also establish a direct link with the proxy small base station by using the method described in the foregoing steps 601 and 602.

605. The proxy small base station sends an activation command to the target small base station according to the activation request.

The proxy small base station activates the backhaul link between the proxy small base station and the small base station when sending the activation command to the target small base station.

606. The target small base station sends the activation command to the small base station.

607. The small base station activates, according to the activation command, the backhaul link that is connected to the proxy small base station through an air interface.

608. The small base station and the proxy small base station transmit to-be-transmitted information in the activated backhaul link through the target small base station.

It should be noted that, when the proxy small base station needs to transmit the to-be-transmitted information through the backhaul link between the proxy small base station and the small base station, the proxy small base station may also determine, by using the method described in steps 601 and 602, the target small base station to which a direct link is to be established, and send the activation command and the identifier of the small base station to the target small base station through the established direct link, so that the target small base station sends the activation command to the small base station according to the identifier of the small base station, and that the small base station activates, according to the activation command, the backhaul link between the small base station and the proxy small base station, and performs information transmission.

In this embodiment, when to-be-transmitted information does not need to be transmitted through a backhaul link, the backhaul link is in a deactivated state; and when to-be-transmitted information needs to be transmitted through the backhaul link, a small base station or a proxy small base station activates a corresponding backhaul link separately through a direct link established with a target small base station, and performs information transmission through the activated backhaul link. It can be implemented that in a scenario of dense deployment of small base stations, bearing pressure of an MME or an S-GW or a macro eNB is reduced by reducing activated backhaul links. The problem that existing backhaul links based on a large number of activated S1 or X2 interfaces consume a large number of memory resources, causing a transmission bottleneck in the backhaul links, may be solved.

In addition, when a channel state of a backhaul link between a proxy device and an access device is poor, or an access device is incapable of accessing a proxy device, activation and deactivation of the backhaul link are performed through the direct link between access devices, which may ensure reliability of information transmission.

It should be noted that, because a transmission delay of a direct link between small base stations may be ensured, that is, the transmission delay is shorter than a maximum transmission delay on a user plane or a control plane of a communications network, a transmission delay of service information or CP signaling that has a high requirement on the delay may be reduced, and network performance is improved.

Figure 7:
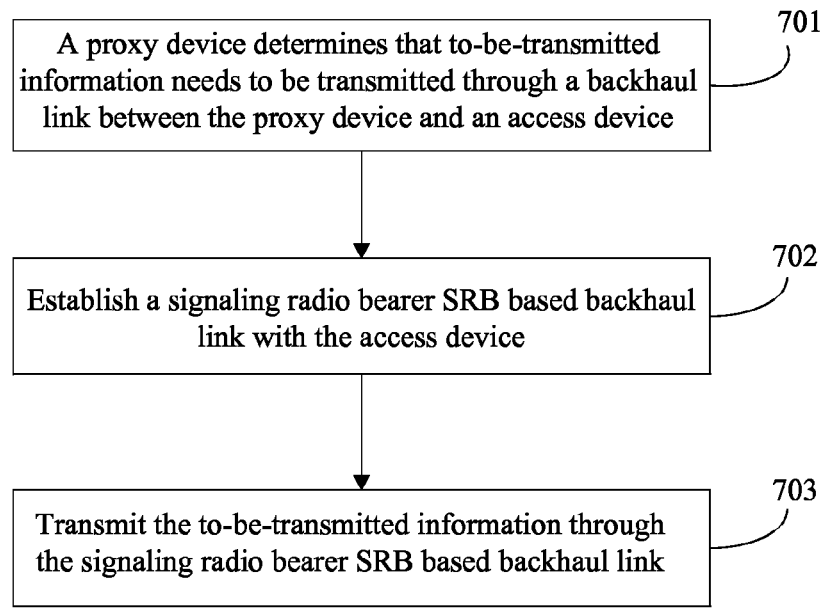
FIG. 7 is a schematic flowchart of a method for transmitting information through a backhaul link according to another embodiment of the present invention.

FIG. 7 is a schematic flowchart of a method for transmitting information through a backhaul link according to another embodiment of the present invention. As shown in FIG. 7, the method specifically includes:

701. A proxy device determines that to-be-transmitted information needs to be transmitted through a backhaul link between the proxy device and an access device.

702. Establish a signaling radio bearer SRB based backhaul link with the access device.

In an optional implementation manner of the present invention, when the proxy device needs to send the to-be-transmitted information to the access device through the backhaul link, the proxy device sends SRB configuration information to the access device by using higher layer signaling, and establishes the signaling radio bearer (signaling radio bearer, SRB) based backhaul link with the access device. Alternatively, when the proxy device needs to receive the to-be-transmitted information from the access device through the backhaul link, the proxy device may receive signaling radio bearer SRB configuration information sent by the access device, and establish the signaling radio bearer SRB based backhaul link with the access device.

For higher layer signaling, specifically the SRB configuration information may be carried by an information element IE in an RRC message, where the RRC message may be an RRC message in the prior art, for example, an RRC connection reconfiguration (RRC CONNECTION RECONFIGURATION) message, which is not limited by this embodiment. The IE in the existing RRC message is extended to carry the configuration information, or the RRC message may be different from the existing RRC message in the prior art.

It should be noted that, establishment of the SRB may also be triggered by the access device. In specific implementation, when the access device determines that the to-be-transmitted information needs to be transmitted through the backhaul link between the access device and the proxy device, the access device receives the signaling radio bearer SRB configuration information from the proxy device by using higher layer signaling, or sends the SRB configuration information to the proxy device, and establishes the signaling radio bearer SRB based backhaul link with the proxy device.

Assuming that a macro eNB is a proxy device and that a small base station is an access device, the following describes in detail establishment of an SRB based backhaul link between the macro eNB and the small base station.

Assuming that the small base station needs to establish a backhaul link with the macro eNB, or when the small base station sends to-be-transmitted information to the macro base station, the small base station initiates a process of RRC connection setup and/or reconfiguration to establish an SRB. Assuming that the macro eNB needs to establish a backhaul link with the small base station, or when the macro base station sends to-be-transmitted information to the small base station through the backhaul link, the macro eNB instructs, in a paging manner, the small base station to initiate a process of RRC connection setup and/or reconfiguration to establish the SRB. It should be noted that, the RRC connection setup and/or reconfiguration message further includes but is not limited to at least one of an identifier of a to-be-established interface or an identifier of the to-be-transmitted information, an identifier of the small base station or an identifier of the macro eNB, and an SRB configuration parameter, in addition to the SRB configuration information.

The identifier of the to-be-established interface is used to identify the type of an interface, for example, carrying a GUMMEI to indicate an S1 interface, carrying a Global eNB ID (small base station) to indicate an X2 interface, carrying a global eNB id (small base station) <-> GUMMEI to indicate an Si interface, or carrying a global eNB id (small base station) <-> global eNB id (macro) to indicate an X2 interface; or a special bit may be directly defined, for example, 1 bit may be used as an indication, where 0 indicates S1 and 1 indicates X2; for example, 2 bits are used, where 00 indicates S1, 01 indicates X2, and 10 indicates X3.

It should be pointed out that, if the identifier of the to-be-established interface already includes the identifier of the small base station or the identifier of the macro eNB, the identifier of the small base station or the identifier of the macro eNB does not need to be carried separately.

In a case in which transmission through a radio backhaul link needs to be specified, establishment of an SRB may also be completed in a manner of configuring the SRB by default or pre-configuring the SRB.

703. Transmit the to-be-transmitted information through the signaling radio bearer SRB based backhaul link.

It should be noted that, when the to-be-transmitted message transmitted through the backhaul link is at least one piece of control signaling, synchronization information, and service data which requires high QoS, a transmission channel based on an SRB transmission mode may be used for transmission. For other types of transmission messages, other transmission modes, for example, a GPRS Tunneling Protocol-User Plane (GTP (GPRS Tunneling Protocol)-User Plane, GTP-U) transmission mode, may be used. Particularly, when a core network entity sends an Evolved Universal Terrestrial Radio Access Network radio access bearer (EUTRAN-radio access bearer, E-RAB) management information through the macro eNB, the macro eNB directly encapsulates the E-RAB management information in an RRC message for sending to the small base station. The E-RAB management information includes E-RAB setup request, E-RAB modify request, and E-RAB release request information.

Because quality of service QoS required for transmitting control signaling is slightly different from that of the RRC signaling (SRB1) and NAS signaling (SRB2), in this embodiment, a new SRB4 may be defined to transmit the control signaling, or an SRB2 whose QoS is the most similar to that of the control signaling is reused to transmit the control signaling.

In the embodiment of the present invention, when information needs to be transmitted through a backhaul link between a proxy device and an access device, an SRB based backhaul link is established between the proxy device and the access device, and the information is transmitted through the SRB based backhaul link. Because the SRB based backhaul link consumes few memory resources, it can be implemented that, in a scenario of dense deployment of small base stations, bearing pressure of an MME or an S-GW or a macro eNB may be reduced by using the technical means of transmitting the information through the SRB based backhaul link consuming few memory resources. The problem that existing backhaul links based on a large number of activated S1 or X2 interfaces consume a large number of memory resources, causing a transmission bottleneck in the backhaul links, may be solved.

It should be noted that, in the foregoing method embodiments, to solve the problem that existing backhaul links based on a large number of activated S1 or X2 interfaces consume a large number of memory resources, causing a transmission bottleneck in the backhaul links, two technical solutions are used. One solution uses a technical means of deactivating a backhaul link when information does not need to be transmitted through the backhaul link and activating the backhaul link when information needs to be transmitted through the backhaul link, which may reduce activated backhaul links, thereby solving the problem that existing backhaul links based on a large number of activated S1 or X2 interfaces consume a large number of memory resources, causing a transmission bottleneck in the backhaul links. The other solution uses an improved bearer mode of an existing backhaul link, that is, an SRB based backhaul link is used to transmit information; because the SRB based backhaul link consumes much fewer memory resources than the memory resources consumed by an existing SCPT bearer based backhaul link, the problem that existing backhaul links based on a large number of activated S1 or X2 interfaces consume a large number of memory resources, causing a transmission bottleneck in the backhaul links, can be solved. The two technical solutions may be used in combination, which may further reduce memory resources consumed by the backhaul link and solve a transmission bottleneck problem in the backhaul link.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that all the embodiments described in this specification belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

Figure 8:
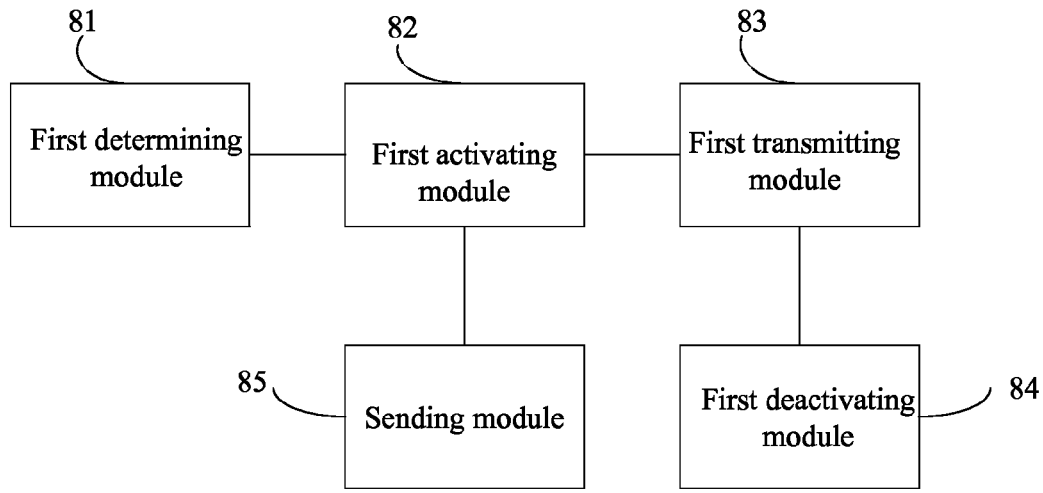
FIG. 8 is a schematic structural diagram of a proxy device according to another embodiment of the present invention.

FIG. 8 is a schematic structural diagram of a proxy device according to another embodiment of the present invention. As shown in FIG. 8, the proxy device includes:

a first determining module 81, configured to determine that to-be-transmitted information needs to be transmitted through a backhaul link, where the backhaul link is a backhaul link that implements transmission between the proxy device and an access device through an air interface and is in a deactivated state;

a first activating module 82, configured to activate the backhaul link on a basis that the first determining module 81 determines that the to-be-transmitted information needs to be transmitted through the backhaul link; and a first transmitting module 83, configured to transmit the to-be-transmitted information through the activated backhaul link on a basis that the first activating module activates the backhaul link.

In an optional implementation manner of the present invention, the first activating module 82 is specifically configured to send an activation command for activating the backhaul link to the access device, so that the access device activates, according to the activation command, the backhaul link that is connected to the proxy device through the air interface.

In an optional implementation manner of the present invention, the proxy device further includes:

a first deactivating module 84, configured to send a deactivation command to the access device on a basis that the first transmitting module transmits the to-be-transmitted information, so that the access device deactivates, according to the deactivation command, the backhaul link that is connected to the proxy device through the air interface.

In an optional implementation manner of the present invention, the proxy device further includes:

a sending module 85, configured to preset activation time information, where the activation time information includes an activation start time and a deactivation start time, and send the activation time information to the access device, so that the access device activates, according to the activation start time, the backhaul link that is connected to the proxy device through the air interface, and deactivates, according to the deactivation start time, the backhaul link that is connected to the proxy device through the air interface.

In an optional implementation manner of the present invention, the first activating module 82 is specifically configured to: send an activation command and an identifier of the access device to an intermediate device by using higher layer signaling, so that the intermediate device sends the activation command to the access device according to the identifier of the access device, so that the access device activates, according to the activation command, the backhaul link that is connected to the proxy device through the air interface.

Correspondingly, the first transmitting module 83 is specifically configured to: send the to-be-transmitted information to the intermediate device through the activated backhaul link, so that the intermediate device sends the to-be-transmitted information to the access device through the activated backhaul link; or receive, through the activated backhaul link, the to-be-transmitted information that comes from the access device and is forwarded by the intermediate device.

Correspondingly, the first deactivating module 84 is specifically configured to: send a deactivation command and the identifier of the access device to the intermediate device by using higher layer signaling, so that the intermediate device sends the deactivation command to the access device according to the identifier of the access device, so that the access device deactivates, according to the deactivation command, the backhaul link that is connected to the proxy device through the air interface.

In the embodiment of the present invention, when to-be-transmitted information needs to be received or sent through a backhaul link, a proxy device activates the backhaul link in a deactivated state, establishes a transmission channel in the activated backhaul link, and receives or sends the to-be-transmitted information through the established transmission channel. Thereby, it may be implemented that the backhaul link is deactivated when to-be-transmitted information does not need to be received or sent through the backhaul link, and that the backhaul link is activated when to-be-transmitted information needs to be received or sent through the backhaul link. It can be implemented that in a scenario of dense deployment of small base stations, bearing pressure of an MME or an S-GW or a macro eNB is reduced by reducing activated S1 or X2 interfaces. The problem that existing backhaul links based on a large number of activated S1 or X2 interfaces consume a large number of memory resources, causing a transmission bottleneck in the backhaul links, may be solved.

Figure 9:
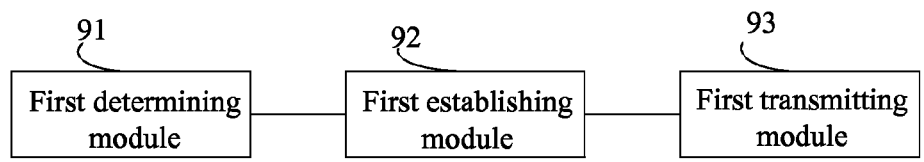
FIG. 9 is a schematic structural diagram of a proxy device according to another embodiment of the present invention.

FIG. 9 is a schematic structural diagram of a proxy device according to another embodiment of the present invention. As shown in FIG. 9, the proxy device includes:

a first determining module 91, configured to determine that to-be-transmitted information needs to be transmitted through a backhaul link between the proxy device and an access device;

a first establishing module 92, configured to establish a signaling radio bearer SRB based backhaul link with the access device on a basis that the first determining module determines that the to-be-transmitted information needs to be transmitted through the backhaul link between the proxy device and the access device; and a first transmitting module 93, configured to transmit the to-be-transmitted information through the signaling radio bearer SRB based backhaul link on a basis of the signaling radio bearer SRB based backhaul link that is established by the first establishing module.

In an optional implementation manner of the present invention, the first establishing module 92 is specifically configured to: receive signaling radio bearer SRB configuration information from the access device by using higher layer signaling, or send the SRB configuration information to the access device, and establish the signaling radio bearer SRB based backhaul link with the access device.

In the embodiment of the present invention, when information needs to be transmitted through a backhaul link between a proxy device and an access device, an SRB based backhaul link is established between the proxy device and the access device, and the information is transmitted through the SRB based backhaul link. Because the SRB based backhaul link consumes few memory resources, it can be implemented that, in a scenario of dense deployment of small base stations, bearing pressure of an MME or an S-GW or a macro eNB may be reduced by using the technical means of transmitting the information through the SRB based backhaul link consuming few memory resources. The problem that existing backhaul links based on a large number of activated S1 or X2 interfaces consume a large number of memory resources, causing a transmission bottleneck in the backhaul links, may be solved.

Figure 10:
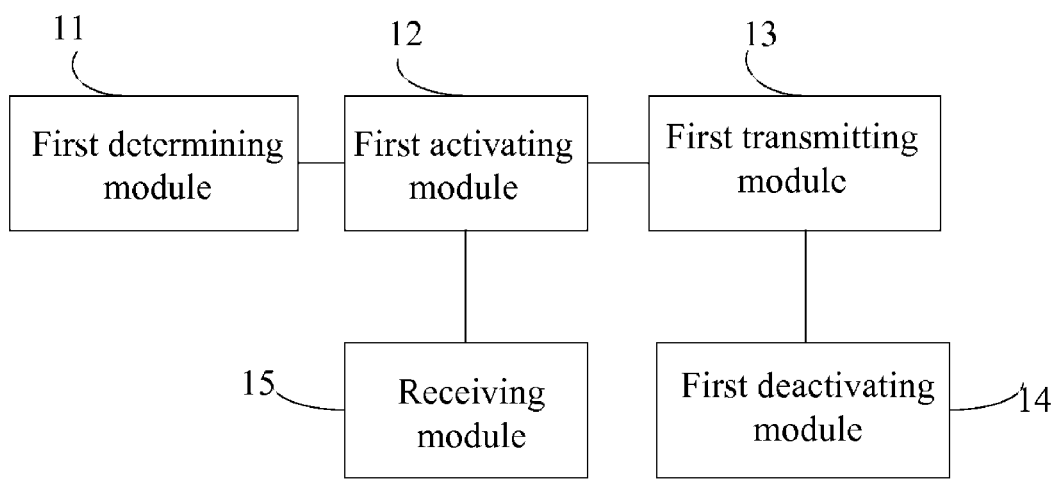
FIG. 10 is a schematic structural diagram of an access device according to another embodiment of the present invention.

FIG. 10 is a schematic structural diagram of an access device according to another embodiment of the present invention. As shown in FIG. 10, the access device includes:

a first determining module 11, configured to determine that to-be-transmitted information needs to be transmitted through a backhaul link, where the backhaul link is a backhaul link that implements transmission between a proxy device and the access device through an air interface and is in a deactivated state;

a first activating module 12, configured to activate the backhaul link on a basis that the first determining module determines that the to-be-transmitted information needs to be transmitted through the backhaul link; and a first transmitting module 13, configured to transmit the to-be-transmitted information through the activated backhaul link on a basis of the backhaul link that is activated by the first activating module.

In an optional implementation manner of the present invention, the first activating module 12 is specifically configured to: send an activation request to the proxy device, so that the proxy device sends an activation command for activating the backhaul link to the access device; and activate, according to the activation command, the backhaul link that is connected to the proxy device through the air interface.

In an optional implementation manner of the present invention, the access device further includes:

a first deactivating module 14, configured to receive a deactivation command sent by the proxy device, and deactivate, according to the deactivation command, the backhaul link that is connected to the proxy device; or if it is determined that the activated backhaul link does not need to transmit to-be-transmitted information within a preset time, deactivate the backhaul link that is connected to the proxy device through the air interface.

In an optional implementation manner of the present invention, the access device further includes:

a receiving module 15, configured to receive activation time information sent by the proxy device, where the activation time information includes an activation start time and a deactivation start time.

Correspondingly, the first activating module 12 is specifically configured to: if it is determined that a current system time is the activation start time, on a basis that the activation time information is received by the receiving module, activate the backhaul link that is connected to the proxy device through the air interface.

In an optional implementation manner of the present invention, the first activating module 12 is specifically configured to: receive, by using higher layer signaling, an activation command forwarded by an intermediate device; and activate, according to the activation command, the backhaul link that is connected to the proxy device through the air interface, where the activation command is sent by the proxy device to the intermediate device by using higher layer signaling.

Correspondingly, the first transmitting module 13 is specifically configured to: send the to-be-transmitted information to the intermediate device through the activated backhaul link, so that the intermediate device sends the to-be-transmitted information to the proxy device through the activated backhaul link; or receive, through the activated backhaul link, the to-be-transmitted information that comes from the proxy device and is forwarded by the intermediate device.

Correspondingly, the first deactivating module 14 is specifically configured to: receive, by using higher layer signaling, a deactivation command that is forwarded by the intermediate device, and deactivate, according to the deactivation command, the backhaul link that is connected to the proxy device through the air interface, where the deactivation command is sent by the proxy device to the intermediate device by using higher layer signaling.

In this embodiment, when to-be-transmitted information needs to be received or sent through a backhaul link, an access device may activate the backhaul link in a deactivated state, and transmit information through the activated backhaul link; and when to-be-transmitted information does not need to be received or sent through the backhaul link, the access device deactivates the backhaul link. It can be implemented that in a scenario of dense deployment of small base stations, bearing pressure of an MME or an S-GW or a macro eNB is reduced by reducing activated backhaul links. The problem that existing backhaul links based on a large number of activated S1 or X2 interfaces consume a large number of memory resources, causing a transmission bottleneck in the backhaul links, may be solved.

Figure 11:
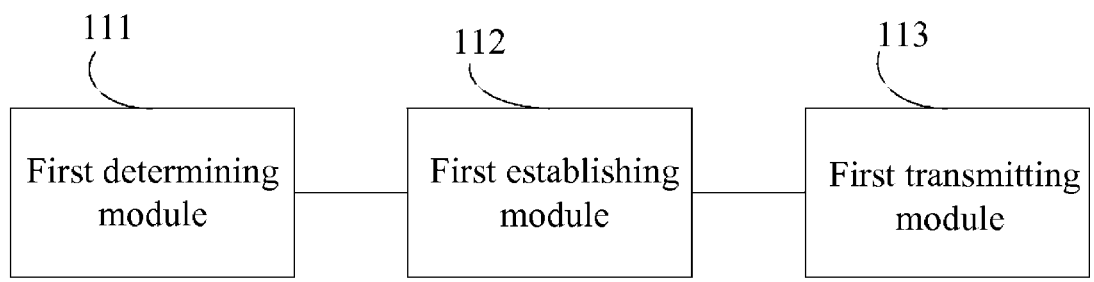
FIG. 11 is a schematic structural diagram of an access device according to another embodiment of the present invention.

FIG. 11 is a schematic structural diagram of an access device according to another embodiment of the present invention. As shown in FIG. 11, the access device includes:

a first determining module 111, configured to determine that to-be-transmitted information needs to be transmitted through a backhaul link between the access device and a proxy device;

a first establishing module 112, configured to establish a signaling radio bearer SRB based backhaul link with the proxy device on a basis that the first determining module determines that the to-be-transmitted information needs to be transmitted through the backhaul link between the access device and the proxy device; and a first transmitting module 113, configured to transmit the to-be-transmitted information through the signaling radio bearer SRB based backhaul link on a basis of the signaling radio bearer SRB based backhaul link that is established by the first establishing module.

In an optional implementation manner of the present invention, the first establishing module 112 is specifically configured to: receive signaling radio bearer SRB configuration information from the proxy device by using higher layer signaling, or send the SRB configuration information to the proxy device, and establish the signaling radio bearer SRB based backhaul link with the proxy device.

In the embodiment of the present invention, when information needs to be transmitted through a backhaul link between a proxy device and an access device, an SRB based backhaul link is established between the proxy device and the access device, and the information is transmitted through the SRB based backhaul link. Because the SRB based backhaul link consumes few memory resources, it can be implemented that, in a scenario of dense deployment of small base stations, bearing pressure of an MME or an S-GW or a macro eNB may be reduced by using the technical means of transmitting the information through the SRB based backhaul link consuming few memory resources. The problem that existing backhaul links based on a large number of activated S1 or X2 interfaces consume a large number of memory resources, causing a transmission bottleneck in the backhaul links, may be solved.

Another embodiment of the present invention further provides a proxy device, where the proxy device includes a processor. When the processor runs, the following procedure may be executed:

determining that to-be-transmitted information needs to be transmitted through a backhaul link, where the backhaul link is a backhaul link that implements transmission between the proxy device and an access device through an air interface and is in a deactivated state; and activating the backhaul link, and transmitting the to-be-transmitted information through the activated backhaul link.

In a first possible implementation manner, the activating the backhaul link includes:

sending an activation command for activating the backhaul link to the access device, so that the access device activates, according to the activation command, the backhaul link that is connected to the proxy device through the air interface.

On a basis of the first possible implementation manner, in a second possible implementation manner, after the transmitting the to-be-transmitted information through the activated backhaul link, the procedure includes:

sending a deactivation command to the access device, so that the access device deactivates, according to the deactivation command, the backhaul link that is connected to the proxy device through the air interface.

In a third possible implementation manner, before the determining that to-be-transmitted information needs to be transmitted through a backhaul link, the procedure includes:

sending activation time information to the access device, where the activation time information includes an activation start time and a deactivation start time, so that the access device activates, according to the activation start time, the backhaul link that is connected to the proxy device through the air interface, and deactivates, according to the deactivation start time, the backhaul link that is connected to the proxy device through the air interface.

In a fourth possible implementation manner, the activating the backhaul link includes:

sending an activation command and an identifier of the access device to an intermediate device by using higher layer signaling, so that the intermediate device sends the activation command to the access device according to the identifier of the access device, so that the access device activates, according to the activation command, the backhaul link that is connected to the proxy device through the air interface.

On a basis of the fourth possible implementation manner, in a fifth possible implementation manner, the transmitting the to-be-transmitted information through the activated backhaul link includes:

sending the to-be-transmitted information to the intermediate device through the activated backhaul link, so that the intermediate device sends the to-be-transmitted information to the access device through the activated backhaul link; or receiving, through the activated backhaul link, the to-be-transmitted information that comes from the access device and is forwarded by the intermediate device.

On a basis of the fourth and fifth possible implementation manners, in a sixth possible implementation manner, after the transmitting the to-be-transmitted information through the activated backhaul link, the procedure includes:

sending a deactivation command and the identifier of the access device to the intermediate device by using higher layer signaling, so that the intermediate device sends the deactivation command to the access device according to the identifier of the access device, so that the access device deactivates, according to the deactivation command, the backhaul link that is connected to the proxy device through the air interface.

Another embodiment of the present invention provides an access device, where the access device includes a processor. When the processor runs, the following procedure may be executed:

determining that to-be-transmitted information needs to be transmitted through a backhaul link, where the backhaul link is a backhaul link that implements transmission between a proxy device and the access device through an air interface and is in a deactivated state; and activating the backhaul link, and transmitting the to-be-transmitted information through the activated backhaul link.

In a first possible implementation manner, the activating the backhaul link includes:

sending an activation request to the proxy device, so that the proxy device sends an activation command for activating the backhaul link to the access device; and activating, according to the activation command, the backhaul link that is connected to the proxy device through the air interface.

On a basis of the first possible implementation manner, in a second possible implementation manner, after the transmitting the to-be-transmitted information through the activated backhaul link, the procedure includes:

receiving a deactivation command sent by the proxy device, and deactivating, according to the deactivation command, the backhaul link that is connected to the proxy device; or if it is determined that the activated backhaul link does not need to transmit to-be-transmitted information within a preset time, deactivating the backhaul link that is connected to the proxy device through the air interface.

In a third possible implementation manner, before the determining that to-be-transmitted information needs to be transmitted through a backhaul link, the procedure includes:

receiving activation time information sent by the proxy device, where the activation time information includes an activation start time and a deactivation start time.

On a basis of the third possible implementation manner, in a fourth possible implementation manner, the activating the backhaul link includes:

if it is determined that a current system time is the activation start time, activating the backhaul link that is connected to the proxy device through the air interface.

In a fifth possible implementation manner, the activating the backhaul link includes:

receiving, by using higher layer signaling, an activation command forwarded by an intermediate device; and activating, according to the activation command, the backhaul link that is connected to the proxy device through the air interface, where the activation command is sent by the proxy device to the intermediate device by using higher layer signaling.

On a basis of the fifth possible implementation manner, in a sixth possible implementation manner, the transmitting the to-be-transmitted information through the activated backhaul link includes:

sending the to-be-transmitted information to the intermediate device through the activated backhaul link, so that the intermediate device sends the to-be-transmitted information to the proxy device through the activated backhaul link; or receiving, through the activated backhaul link, the to-be-transmitted information that comes from the proxy device and is forwarded by the intermediate device.

On a basis of the fifth and sixth possible implementation manners, in a seventh possible implementation manner, after the transmitting the to-be-transmitted information through the activated backhaul link, the procedure includes:

receiving, by using higher layer signaling, a deactivation command that is forwarded by the intermediate device, and deactivating, according to the deactivation command, the backhaul link that is connected to the proxy device through the air interface, where the deactivation command is sent by the proxy device to the intermediate device by using higher layer signaling.

In the embodiment of the present invention, when to-be-transmitted information needs to be received or sent through a backhaul link between a proxy device and an access device, the backhaul link in a deactivated state is activated, a transmission channel is established in the activated backhaul link, and the to-be-transmitted information is received or sent through the established transmission channel. Thereby, it may be implemented that the backhaul link is deactivated when to-be-transmitted information does not need to be received or sent through the backhaul link, and that the backhaul link is activated when to-be-transmitted information needs to be received or sent through the backhaul link. It can be implemented that in a scenario of dense deployment of small base stations, bearing pressure of an MME or an S-GW or a macro eNB is reduced by reducing activated S1 or X2 interfaces. The problem that existing backhaul links based on a large number of activated S1 or X2 interfaces consume a large number of memory resources, causing a transmission bottleneck in the backhaul links, may be solved.

Another embodiment of the present invention provides a proxy device, where the proxy device includes a processor. When the processor runs, the following procedure may be executed:

determining that to-be-transmitted information needs to be transmitted through a backhaul link between the proxy device and an access device; and establishing a signaling radio bearer SRB based backhaul link with the access device, and transmitting the to-be-transmitted information through the signaling radio bearer SRB based backhaul link.

In a first possible implementation manner, the establishing a signaling radio bearer SRB based backhaul link with the access device includes:

receiving signaling radio bearer SRB configuration information from the access device by using higher layer signaling, or sending the SRB configuration information to the access device, and establishing the signaling radio bearer SRB based backhaul link with the access device.

Another embodiment of the present invention provides an access device, where the access device includes a processor. When the processor runs, the following procedure may be executed:

determining that to-be-transmitted information needs to be transmitted through a backhaul link between the access device and a proxy device; and establishing a signaling radio bearer SRB based backhaul link with the proxy device, and transmitting the to-be-transmitted information through the signaling radio bearer SRB based backhaul link.

In a first possible implementation manner, the establishing a signaling radio bearer SRB based backhaul link with the proxy device includes:

receiving signaling radio bearer SRB configuration information from the proxy device by using higher layer signaling, or sending the SRB configuration information to the proxy device, and establishing the signaling radio bearer SRB based backhaul link with the proxy device.

In the embodiment of the present invention, when information needs to be transmitted through a backhaul link between a proxy device and an access device, an SRB based backhaul link is established between the proxy device and the access device, and the information is transmitted through the SRB based backhaul link. Because the SRB based backhaul link consumes few memory resources, it can be implemented that, in a scenario of dense deployment of small base stations, bearing pressure of an MME or an S-GW or a macro eNB may be reduced by using the technical means of transmitting the information through the SRB based backhaul link consuming few memory resources. The problem that existing backhaul links based on a large number of activated S1 or X2 interfaces consume a large number of memory resources, causing a transmission bottleneck in the backhaul links, may be solved.

Another embodiment of the present invention provides a system for transmitting a message through a backhaul link, where the system includes:

the proxy device in the embodiment shown in FIG. 8 and the access device in the embodiment shown in FIG. 10, where for related content of the proxy device, reference is made to the related description of the embodiment shown in FIG. 8, and for related content of the access device, reference is made to the related description of the embodiment shown in FIG. 10.

It should be noted that, the proxy device includes at least one of a macro base station, a local gateway, and a small base station; and the access device is a low power access point, including at least one of a small cell, a pico cell, and a home base station.

In an optional implementation manner of the present invention, the system further includes an intermediate device, configured to receive, by using higher layer signaling, an activation command and an identifier of the access device that are sent by the proxy device, and send the activation command to the access device according to the identifier of the access device, so that the access device activates, according to the activation command, a backhaul link that is connected to the proxy device through an air interface, where:

the intermediate device is further configured to send, to the access device, to-be-transmitted information sent by the proxy device through the backhaul link, or send, to the proxy device, to-be-transmitted information sent by the access device through the backhaul link;

the intermediate device is further configured to receive, by using higher layer signaling, a deactivation command and the identifier of the access device that are sent by the proxy device, and send the deactivation command to the access device according to the identifier of the access device, so that the access device deactivates, according to the deactivation command, the backhaul link that is connected to the proxy device through the air interface; and the intermediate device is further configured to receive, by using higher layer signaling, an activation request and an identifier of the proxy device that are sent by the access device, and send the activation request to the proxy device according to the identifier of the proxy device, so that the proxy device returns an activation command according to the activation request.

In the embodiment of the present invention, when to-be-transmitted information needs to be received or sent through a backhaul link between a proxy device and an access device, the backhaul link in a deactivated state is activated, a transmission channel is established in the activated backhaul link, and the to-be-transmitted information is received or sent through the established transmission channel. Thereby, it may be implemented that the backhaul link is deactivated when to-be-transmitted information does not need to be received or sent through the backhaul link, and that the backhaul link is activated when to-be-transmitted information needs to be received or sent through the backhaul link. It can be implemented that in a scenario of dense deployment of small base stations, bearing pressure of an MME or an S-GW or a macro eNB is reduced by reducing activated S1 or X2 interfaces. The problem that existing backhaul links based on a large number of activated S1 or X2 interfaces consume a large number of memory resources, causing a transmission bottleneck in the backhaul links, may be solved.

Another embodiment of the present invention provides a system for transmitting a message through a backhaul link, where the system includes the proxy device in the embodiment shown in FIG. 9 and the access device in the embodiment shown in FIG. 11. For related content of the proxy device, reference is made to the related description of the embodiment shown in FIG. 9, and for related content of the access device, reference is made to the related description of the embodiment shown in FIG. 11.

It should be noted that, the proxy device includes at least one of a macro base station, a local gateway, and a small base station; and the access device is a low power access point, including at least one of a small cell, a pico cell, and a home base station.

In the embodiment of the present invention, when information needs to be transmitted through a backhaul link between a proxy device and an access device, an SRB based backhaul link is established between the proxy device and the access device, and the information is transmitted through the SRB based backhaul link. Because the SRB based backhaul link consumes few memory resources, it can be implemented that, in a scenario of dense deployment of small base stations, bearing pressure of an MME or an S-GW or a macro eNB may be reduced by using the technical means of transmitting the information through the SRB based backhaul link consuming few memory resources. The problem that existing backhaul links based on a large number of activated S1 or X2 interfaces consume a large number of memory resources, causing a transmission bottleneck in the backhaul links, may be solved.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network element. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for transmitting information through a backhaul link, wherein the method comprises:
   determining, by a proxy device, that to-be-transmitted information needs to be transmitted through a primary backhaul link between the proxy device and an access device, wherein the primary backhaul link implements transmission between the proxy device and the access device through an air interface and is in a deactivated state; and
   activating the primary backhaul link, upon determining that the to-be-transmitted information needs to be transmitted through the primary backhaul link, and transmitting the to-be-transmitted information through the activated primary backhaul link, wherein:
   the activating the primary backhaul link comprises:
      sending, by the proxy device, an activation command for activating the primary backhaul link to the access device, so that the access device activates, according to the activation command, the primary backhaul link that is connected to the proxy device through the air interface, and
   after the transmitting the to-be-transmitted information through the activated primary backhaul link, the method comprises:
      sending, by the proxy device, a deactivation command to the access device, so that the access device deactivates, according to the deactivation command, the primary backhaul link that is connected to the proxy device through the air interface.

2. The method according to claim 1, wherein before the determining, the method comprises:
   sending, by the proxy device, activation time information to the access device, wherein the activation time information comprises an activation start time and a deactivation start time, so that the access device activates, according to the activation start time, the primary backhaul link that is connected to the proxy device through the air interface, and deactivates, according to the deactivation start time, the primary backhaul link that is connected to the proxy device through the air interface.

3. A method for transmitting information through a backhaul link, wherein the method comprises:
   determining, by an access device, that to-be-transmitted information needs to be transmitted through a primary backhaul link between the access device and a proxy device, wherein the primary backhaul link implements transmission between the proxy device and the access device through an air interface and is in a deactivated state; and
   activating the primary backhaul link, upon determining that the to-be-transmitted information needs to be transmitted through the primary backhaul link, and transmitting the to-be-transmitted information through the activated primary backhaul link, wherein:
   the activating the primary backhaul link comprises:
      sending, by the access device, an activation request to the proxy device, so that the proxy device sends an activation command for activating the primary backhaul link to the access device; and
      activating, according to the activation command, the primary backhaul link that is connected to the proxy device through the air interface, and after the transmitting the to-be-transmitted information through the activated primary backhaul link, the method comprises:
      receiving, by the access device, a deactivation command sent by the proxy device, and deactivating, according to the deactivation command, the primary backhaul link that is connected to the proxy device; or
      if it is determined that the activated primary backhaul link does not need to transmit to-be-transmitted information within a preset time, deactivating, by the access device, the primary backhaul link that is connected to the proxy device through the air interface.

4. The method according to claim 3, wherein the activating the primary backhaul link comprises:
   receiving, by the access device by using higher layer signaling, an activation command forwarded by an intermediate device; and
   activating, according to the activation command, the primary backhaul link that is connected to the proxy device through the air interface, wherein
   the activation command is sent by the proxy device to the intermediate device by using higher layer signaling.

5. The method according to claim 4, wherein the transmitting the to-be-transmitted information through the activated primary backhaul link comprises:
   sending, by the access device, the to-be-transmitted information to the intermediate device through the activated primary backhaul link, so that the intermediate device sends the to-be-transmitted information to the proxy device through the activated primary backhaul link; or receiving, through the activated primary backhaul link, the to-be-transmitted information that comes from the proxy device and is forwarded by the intermediate device.

6. A proxy device, comprising:
at least one hardware processor interfaced to a memory including instructions executable to control the at least one hardware processor to implement:
   a first determining module, configured to determine that to-be-transmitted information needs to be transmitted through a primary backhaul link between the proxy device and an access device, wherein the primary backhaul link implements transmission between the proxy device and the access device through an air interface and is in a deactivated state;
   a first activating module, configured to activate the primary backhaul link upon the first determining module determining that the to-be-transmitted information needs to be transmitted through the primary backhaul link; and
   a first transmitting module, configured to transmit the to-be-transmitted information through the activated primary backhaul link upon the first activating module activating the primary backhaul link, wherein:
   the first activating module is configured to send an activation command for activating the primary backhaul link to the access device, so that the access device activates, according to the activation command, the primary backhaul link that is connected to the proxy device through the air interface, and
   the instructions further control the at least one hardware processor to implement a first deactivating module, configured to send a deactivation command to the access device on a basis that the first transmitting module transmits the to-be-transmitted information, so that the access device deactivates, according to the deactivation command, the primary backhaul link that is connected to the proxy device through the air interface.

7. The proxy device according to claim 6, wherein instructions further control the at least one hardware processor to implement a sending module, configured to send activation time information to the access device, wherein the activation time information comprises an activation start time and a deactivation start time, so that the access device activates, according to the activation start time, the primary backhaul link that is connected to the proxy device through the air interface, and deactivates, according to the deactivation start time, the primary backhaul link that is connected to the proxy device through the air interface.

8. The proxy device according to claim 6, wherein the first activating module is configured to: send an activation command and an identifier of the access device to an intermediate device by using higher layer signaling, so that the intermediate device sends the activation command to the access device according to the identifier of the access device, so that the access device activates, according to the activation command, the primary backhaul link that is connected to the proxy device through the air interface.

9. An access device, comprising:
at least one hardware processor interfaced to a memory including instructions executable to control the at least one hardware processor to implement:
   a first determining module, configured to determine that to-be-transmitted information needs to be transmitted through a primary backhaul link between the access device and a proxy device, wherein the primary backhaul link implements transmission between the proxy device and the access device through an air interface and is in a deactivated state;
   a first activating module, configured to activate the primary backhaul link upon the first determining module determining that the to-be-transmitted information needs to be transmitted through the primary backhaul link; and
   a first transmitting module, configured to transmit the to-be-transmitted information through the activated primary backhaul link upon the primary backhaul link being activated by the first activating module, wherein:
   the first activating module is configured to: send an activation request to the proxy device, so that the proxy device sends an activation command for activating the primary backhaul link to the access device; and activate, according to the activation command, the primary backhaul link that is connected to the proxy device through the air interface, and
   the instructions further control the at least one hardware processor to implement a first deactivating module, configured to receive a deactivation command sent by the proxy device, and deactivate, according to the deactivation command, the primary backhaul link that is connected to the Proxy device; or if it is determined that the activated primary backhaul link does not need to transmit to-be-transmitted information within a preset time, deactivate the primary backhaul link that is connected to the proxy device through the air interface.

* * * * *